US012614666B2

(12) United States Patent
Cho

(10) Patent No.: US 12,614,666 B2
(45) Date of Patent: Apr. 28, 2026

(54) MULTILAYER ELECTRONIC COMPONENT

(71) Applicant: SAMSUNG ELECTRO-MECHANICS CO., LTD., Suwon-si (KR)

(72) Inventor: Beom Joon Cho, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 93 days.

(21) Appl. No.: 17/974,950

(22) Filed: Oct. 27, 2022

(65) Prior Publication Data

US 2023/0170140 A1     Jun. 1, 2023

(30) Foreign Application Priority Data

Nov. 29, 2021     (KR) ........................ 10-2021-0167519

(51) Int. Cl.
| | |
|---|---|
| *H01G 4/30* | (2006.01) |
| *H01G 2/06* | (2006.01) |
| *H01G 4/232* | (2006.01) |

(52) U.S. Cl.
CPC ............... *H01G 2/06* (2013.01); *H01G 4/232* (2013.01); *H01G 4/30* (2013.01)

(58) Field of Classification Search
CPC ............ H01G 4/30; H01G 2/06; H01G 4/232; H01G 4/248; H01G 4/228; H01G 4/005
(Continued)

(56) References Cited

U.S. PATENT DOCUMENTS 6,433,992 B2 * 8/2002 Nakagawa ........... H05K 3/3426
                                                    361/306.3
6,473,291 B1   10/2002 Stevenson
                 (Continued)

FOREIGN PATENT DOCUMENTS

CN        108091487 A     5/2018
CN        110875133 A     3/2020
                 (Continued)

OTHER PUBLICATIONS

Office Action issued Sep. 25, 2023 for corresponding Japanese Patent Application No. 2022-178305 (See English Translation).
(Continued)

*Primary Examiner* — Arun Ramaswamy
(74) *Attorney, Agent, or Firm* — MORGAN, LEWIS & BOCKIUS LLP

(57)     ABSTRACT
A multilayer electronic component includes a capacitor including a body comprising a dielectric layer and first and second internal electrodes alternately disposed with the dielectric layer therebetween, first and second external electrodes disposed on the body, a first metal frame disposed on the first external electrode of the capacitor, and a second metal frame disposed on the second external electrode of the capacitor. W>L, wherein L is a dimension of the capacitor in a second direction and W is a dimension of the capacitor in a third direction, and the first and second metal frames include support portions in contact with the first and second external electrodes, extension portions extending from the support portions in a first direction and disposed to be spaced apart from the body and the first and second external electrodes, and mounting portions extending from one ends of the extension portion in the second direction.

8 Claims, 17 Drawing Sheets

(58) Field of Classification Search
   USPC ............. 361/301.4, 306.3, 321.3, 321.1, 303
   See application file for complete search history.

(56) References Cited

U.S. PATENT DOCUMENTS

| | | | | |
|---|---|---|---|---|
| 6,515,844 B1 * | 2/2003 | Moriwaki | ............. | H01G 2/065 |
| | | | | 361/306.3 |
| 6,518,632 B1 | 2/2003 | Yoshida et al. | | |
| 8,233,265 B2 * | 7/2012 | Otsuka | ................... | H01G 4/232 |
| | | | | 361/309 |
| 8,315,035 B2 * | 11/2012 | Togashi | ................... | H01G 4/30 |
| | | | | 361/321.1 |
| 8,797,712 B2 * | 8/2014 | Otsuka | ................... | H01G 4/228 |
| | | | | 361/309 |
| 9,911,535 B2 * | 3/2018 | Mori | ........................ | H01G 2/06 |
| 10,607,778 B2 | 3/2020 | Ando et al. | | |
| 10,879,003 B2 | 12/2020 | Cho et al. | | |
| 2004/0183147 A1 | 9/2004 | Togashi et al. | | |
| 2010/0123995 A1 | 5/2010 | Otsuka et al. | | |
| 2010/0188798 A1 * | 7/2010 | Togashi | ............... | H05K 3/3426 |
| | | | | 361/306.3 |
| 2015/0187495 A1 | 7/2015 | Maeda et al. | | |
| 2015/0371778 A1 | 12/2015 | Engel et al. | | |
| 2016/0240317 A1 * | 8/2016 | Ro | ........................... | H01G 4/30 |
| 2017/0345571 A1 * | 11/2017 | Imaeda | ................... | H01G 4/248 |
| 2018/0033556 A1 * | 2/2018 | Itamochi | ................ | H01C 7/003 |
| 2018/0075973 A1 * | 3/2018 | Ando | ...................... | H01G 4/224 |
| 2018/0211783 A1 | 7/2018 | Ando et al. | | |
| 2018/0211784 A1 * | 7/2018 | Ando | ........................ | H01G 2/06 |
| 2019/0006103 A1 | 1/2019 | Mochigi et al. | | |
| 2020/0075245 A1 * | 3/2020 | Cho | ........................ | H01G 4/38 |
| 2021/0183579 A1 | 6/2021 | Kim et al. | | |

FOREIGN PATENT DOCUMENTS

| | | | |
|---|---|---|---|
| CN | 112967887 | A | 6/2021 |
| JP | 62-135426 | U | 8/1987 |
| JP | 2-8125 | U | 1/1990 |
| JP | 2-45620 | U | 3/1990 |
| JP | H02-45620 | A | 3/1990 |
| JP | H06-014458 | Y2 | 4/1994 |
| JP | 2000-223359 | A | 8/2000 |
| JP | 2004-273935 | A | 9/2004 |
| JP | 2004-288847 | A | 10/2004 |
| JP | 2009-26906 | A | 2/2009 |
| JP | 2010-123614 | A | 6/2010 |
| JP | 2012-23322 | A | 2/2012 |
| JP | 2012-033650 | A | 2/2012 |
| JP | 2015-128084 | A | 7/2015 |
| JP | 2016-535445 | A | 11/2016 |
| JP | 2018-18938 | A | 2/2018 |
| JP | 2018-85426 | A | 5/2018 |
| JP | 2019-12749 | A | 1/2019 |
| JP | 2020-150088 | A | 9/2020 |
| JP | 2021-036593 | A | 3/2021 |
| KR | 10-2004-0082995 | A | 9/2004 |
| KR | 10-2019-0121165 | A | 10/2019 |
| WO | 2015/065974 | A1 | 5/2015 |

OTHER PUBLICATIONS

Office Action issued in corresponding Korean Patent Application No. 10-2021-0167519 dated Apr. 18, 2025, with English translation.
Office Action issued in corresponding Chinese Patent Application No. 202211491140.4 dated May 22, 2025, with English translation.
Office Action issued in corresponding Japanese Patent Application No. 2024-079415 dated May 27, 2025, with English translation.

* cited by examiner

I - I'

MULTILAYER ELECTRONIC COMPONENT

CROSS-REFERENCE TO RELATED APPLICATION

This application claims benefit of priority to Korean Patent Application No. 10-2021-0167519 filed on Nov. 29, 2021 in the Korean Intellectual Property Office, the disclosure of which is incorporated herein by reference in its entirety.

TECHNICAL FIELD

The present disclosure relates to a multilayer electronic component.

BACKGROUND

A multilayer ceramic capacitor (MLCC), a multilayer electronic component, is a chip-type condenser mounted on printed circuit boards of various types of electronic products such as display devices including liquid crystal displays (LCDs) and plasma display panels (PDPs), computers, smartphones, cell phones, and the like to allow electricity to be charged therein and discharged therefrom.

Such an MLCC having advantages such as compactness, guaranteed high capacitance, and ease in mounting thereof may be used as a component of various electronic devices.

Recently, demand for MLCCs required for in-vehicle power drive systems and infotainment systems in the field of eco-friendly vehicles and electric vehicles has also increased.

Multilayer electronic components including MLCCs applied to automobiles are required to have high levels of thermal and electrical reliability for high temperature, high vibrations, and high pressure environments of automobiles.

Therefore, the need for a multilayer electronic component having strong resistance to external vibrations and deformation and strong electrical reliability has increased.

As a usage environment of multilayer electronic components becomes severe, cracks are likely to occur due to vibrations or mechanical deformation of a mounting board. When a multilayer electronic component of related art is mounted on a substrate, a body of the multilayer electronic component is in direct contact with the substrate by solders, so that heat or mechanical deformation occurring from the substrate or adjacent components may be directly transmitted to the multilayer electronic component, and thus, it is difficult to secure a high level of reliability.

Accordingly, recently, a method has been proposed to secure a gap between a multilayer ceramic capacitor and a mounting substrate by bonding a metal frame to a side surface of the multilayer ceramic capacitor so that thermal and mechanical stress from the substrate is not directly transmitted to the multilayer ceramic capacitor.

However, since the metal frame has a certain thickness and is bonded to a conducting part such as an external electrode, a current path increases, and thus equivalent series inductance (ESL) increases.

Accordingly, there is a need for a multilayer electronic component which may implement a low ESL, while protecting the multilayer ceramic capacitor from thermal and mechanical stress transferred from a substrate.

SUMMARY

An aspect of the present disclosure is to solve a problem in which thermal or mechanical deformation occurring in a substrate is transferred to a multilayer ceramic capacitor.

An aspect of the present disclosure is also to solve a problem in which a current path increases to increase equivalent series inductance (ESL) when a metal frame is bonded to a multilayer capacitor.

However, an aspect of the present disclosure is not limited to the above, and will be more easily understood in the course of describing specific exemplary embodiments of the present disclosure.

According to an aspect of the present disclosure, a multilayer electronic component includes: a capacitor including a body comprising a dielectric layer and first and second internal electrodes alternately disposed with the dielectric layer interposed therebetween and including first and second surfaces opposing each other in a first direction, third and fourth surfaces connected to the first and second surfaces and opposing each other in a second direction, and fifth and sixth surfaces connected to the first to fourth surfaces and opposing each other in a third direction, a first external electrode disposed on the third surface of the body, and a second external electrode disposed on the fourth surface of the body; a first metal frame disposed on the first external electrode of the capacitor; and a second metal frame disposed on the second external electrode of the capacitor. W>L in which L is a dimension of the capacitor in the second direction and W is a dimension of the capacitor in the third direction, and the first and second metal frames include support portions in contact with the first and second external electrodes, extension portions extending from the support portions in the first direction and disposed to be spaced apart from the body and the first and second external electrodes, and mounting portions extending from one ends of the extension portion in the second direction.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
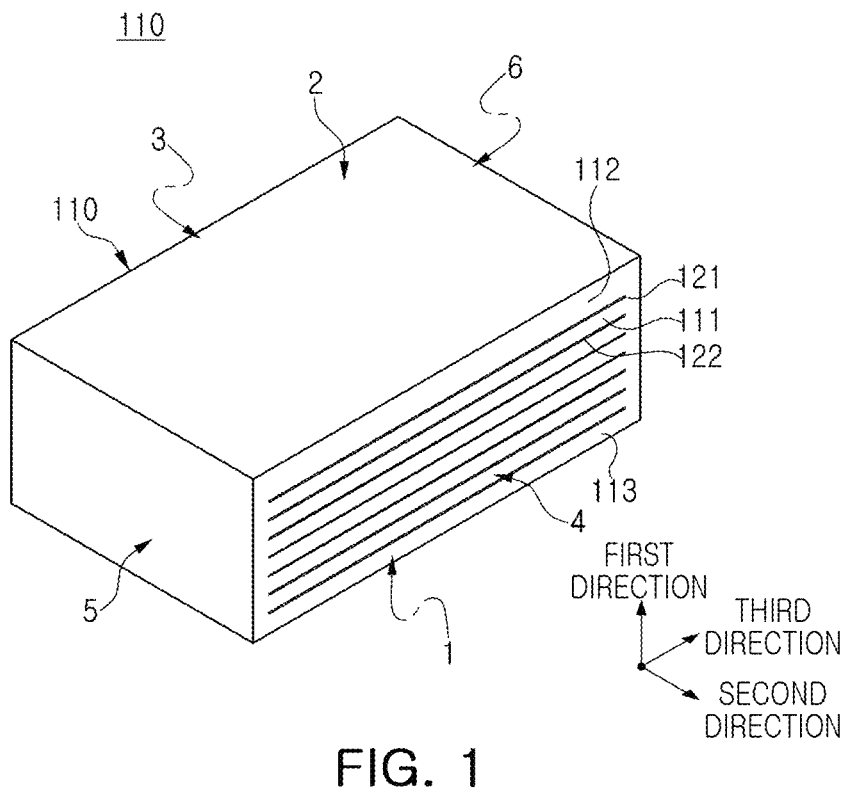
FIG. 1 is a perspective view schematically illustrating a body according to an exemplary embodiment in the present disclosure.

Exemplary embodiments of the present disclosure will now be described in detail with reference to the accompanying drawings.

In the drawings, a first direction may be defined as a stacking direction or a thickness direction, a second direction may be defined as a length direction, and a third direction may be defined as a width direction.

Multilayer Electronic Component

FIG. 1 is a perspective view schematically illustrating a body 110 of a multilayer electronic component according to an exemplary embodiment in the present disclosure.

Figure 2:
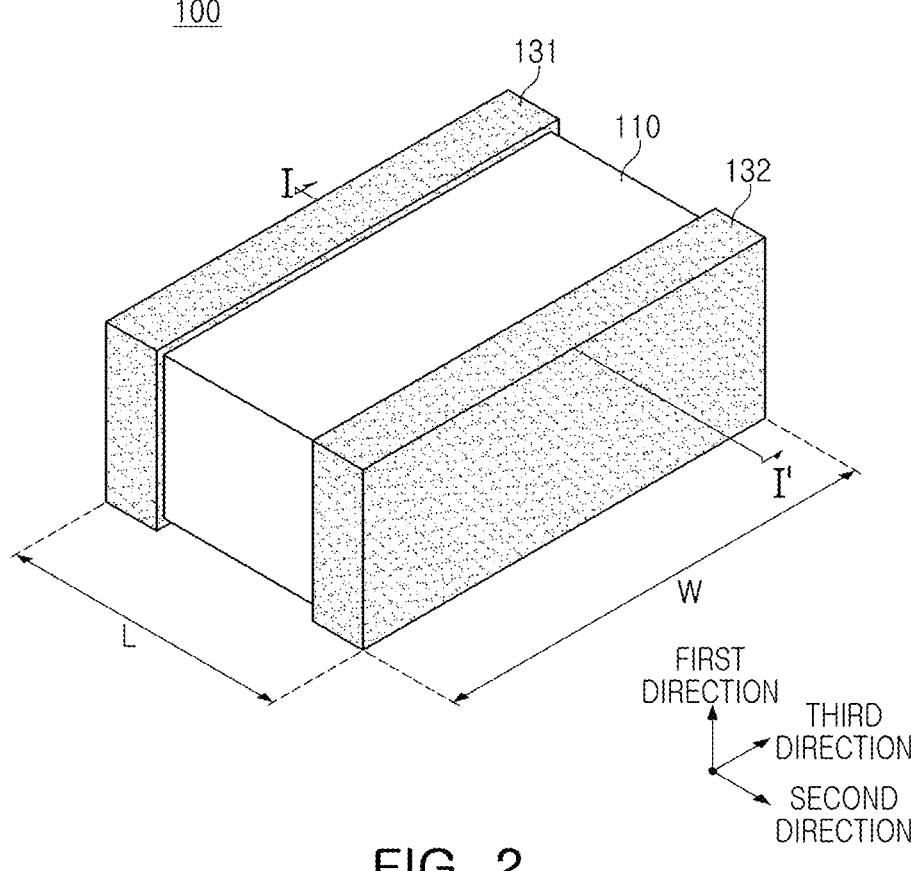
FIG. 2 is a perspective view schematically illustrating a capacitor according to an exemplary embodiment in the present disclosure.

FIG. 2 is a perspective view schematically illustrating a capacitor 100 according to an exemplary embodiment in the present disclosure.

Figure 3:
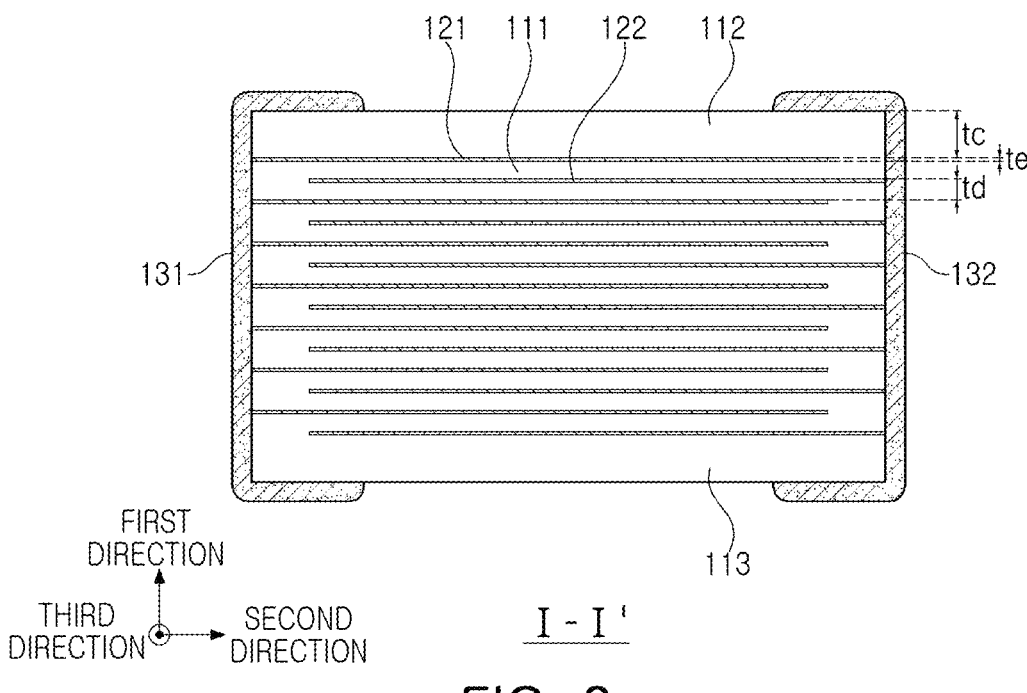
FIG. 3 is a cross-sectional view taken along line I-I' of FIG. 2.

FIG. 3 is a cross-sectional view taken along line I-I' of FIG. 1.

Figure 4:
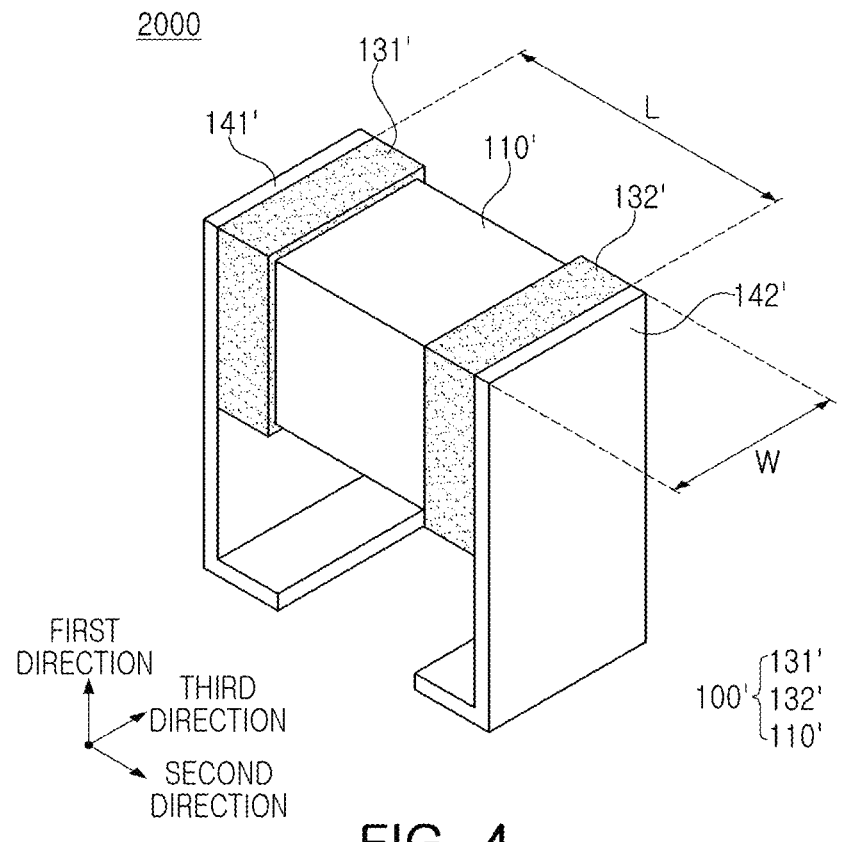
FIG. 4 is a perspective view schematically illustrating a multilayer electronic component according to a comparative example.

FIG. 4 is a perspective view schematically illustrating a multilayer electronic component 2000 according to a comparative example.

Figure 5:
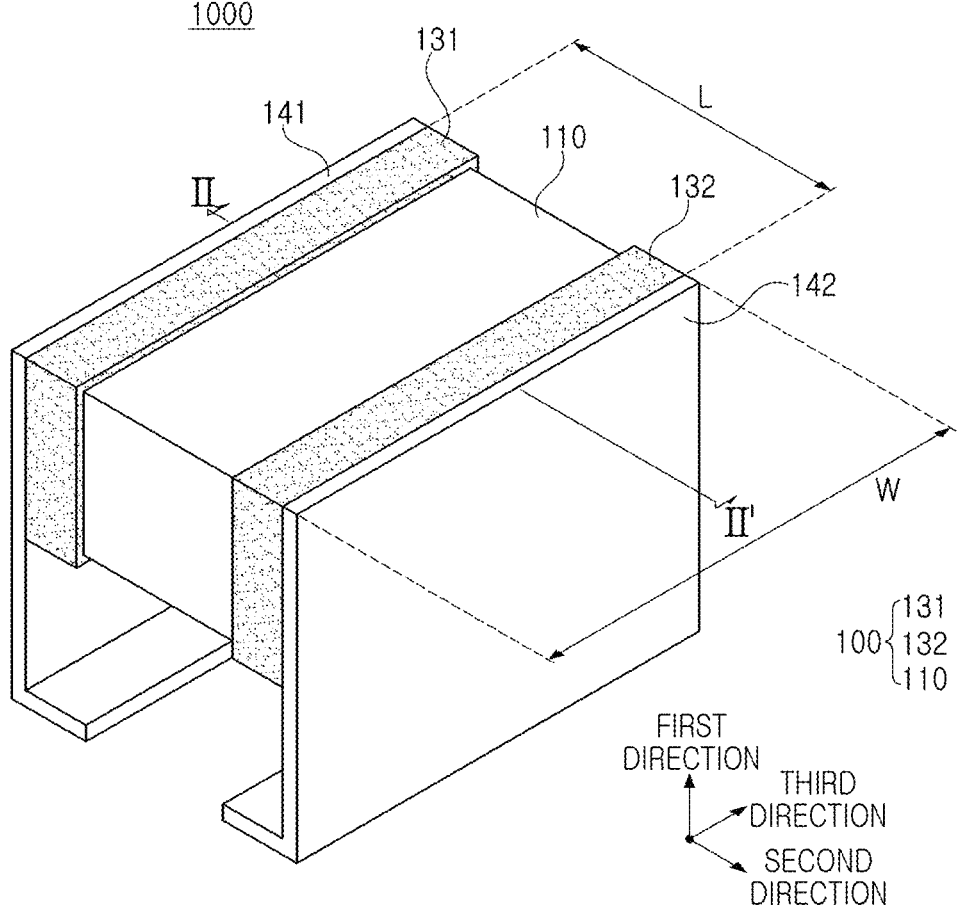
FIG. 5 is a perspective view schematically illustrating a multilayer electronic component according to an exemplary embodiment in the present disclosure.

FIG. 5 is a perspective view schematically illustrating a multilayer electronic component 1000 according to an exemplary embodiment in the present disclosure.

Figure 6:
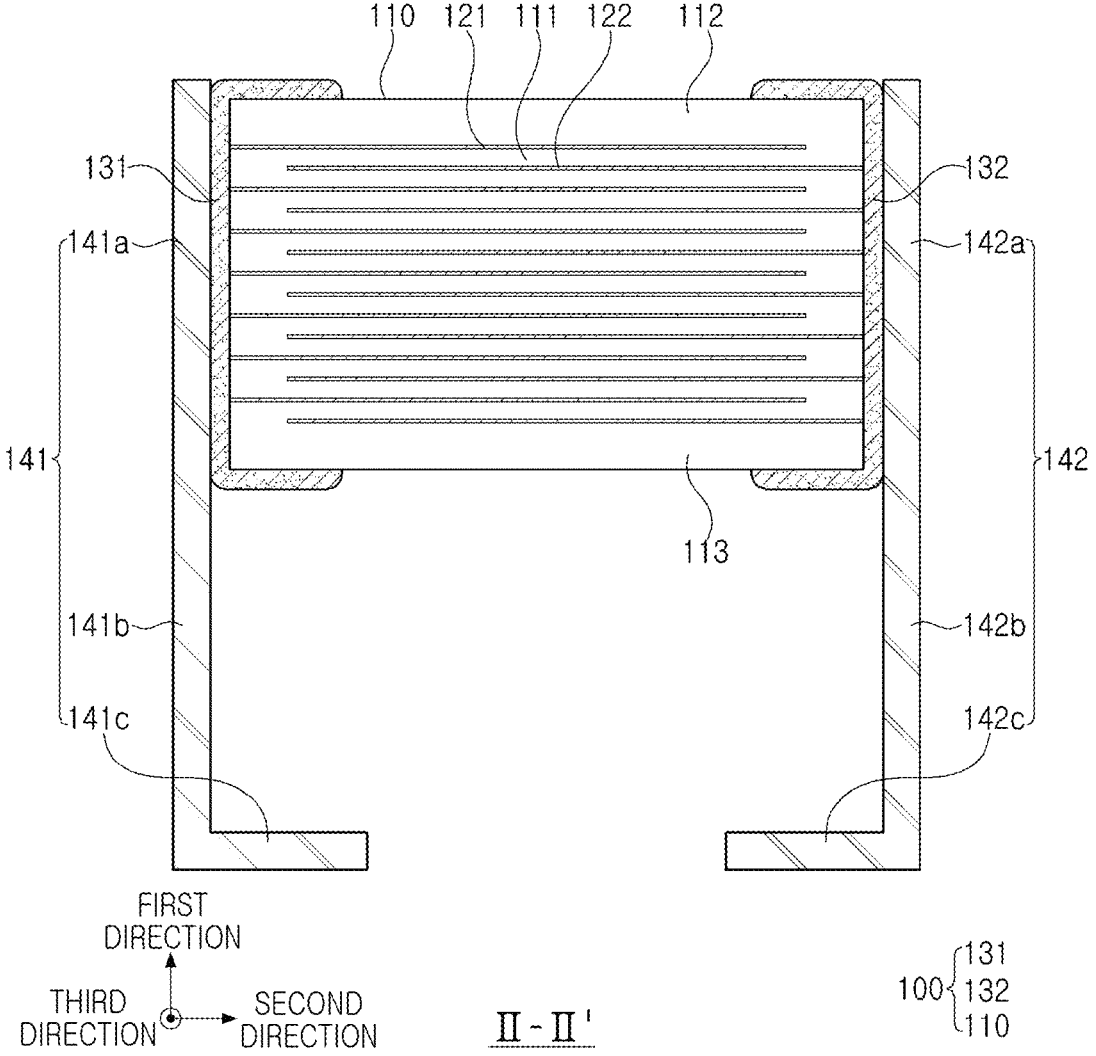
FIG. 6 is a cross-sectional view taken along line II-II' of FIG. 5.

FIG. 6 is a cross-sectional view taken along line II-II' of FIG. 5.

Hereinafter, the multilayer electronic component 1000 according to an exemplary embodiment in the present disclosure will be described in detail with reference to FIGS. 1 to 6.

The multilayer electronic component 1000 according to an exemplary embodiment in the present disclosure may include a body including a dielectric layer 111 and first and second internal electrodes 121 and 122 alternately disposed with the dielectric layer 111 interposed therebetween and include first and second surfaces 1 and 2 opposing each other in a first direction, third and fourth surfaces 3 and 4 connected to the first and second surfaces and opposing each other in a second direction, and fifth and sixth surfaces 5 and 6 connected to the first to fourth surfaces and opposing each other in a third direction.

FIG. 1 is a perspective view schematically illustrating a body 110 of a multilayer electronic component according to an exemplary embodiment in the present disclosure.

In the body 110, the dielectric layer 111 and the first and second internal electrodes 121 and 122 are alternately stacked.

A specific shape of the body 110 is not limited, but, as illustrated, the body 110 may have a hexahedral shape or a similar shape. Due to shrinkage of ceramic powder particle contained in the body 110 during sintering, the body 110 may not have a hexahedral shape with perfect straight lines but a substantially hexahedral shape.

The body 110 may have the first and second surfaces 1 and 2 opposing each other in the first direction, the third and fourth surfaces 3 and 4 connected to the first and second surfaces 1 and 2 and opposing each other in the second direction, and the fifth and sixth surfaces 5 and 6 connected to the first and second surfaces 1 and 2, connected to the third and fourth surfaces 3 and 4, and opposing each other in the third direction.

A plurality of dielectric layers 111 forming the body 110 are in a sintered state, and adjacent dielectric layers 111 may be integrated such that boundaries therebetween may not be readily apparent without using a scanning electron microscope (SEM).

A material for forming the dielectric layer 111 is not limited as long as sufficient electrostatic capacitance may be obtained therewith. For example, a barium titanate-based material, a lead composite perovskite-based material, or a strontium titanate-based material may be used. The barium titanate-based material may include a $BaTiO_3$-based ceramic powder particle, and the ceramic powder particle may include $BaTiO_3$ and $(Ba_{1-x}Ca_x)TiO_3$, $Ba(Ti_{1-y}Ca_y)O_3$, $(Ba_{1-x}Ca_x)(Ti_{1-y}Zr_y)O_3$, or $Ba(Ti_{1-y}Zr_y)O_3$ obtained by partially dissolving calcium (Ca), zirconium (Zr), and the like in $BaTiO_3$.

As a material for forming the dielectric layer 111, various ceramic additives, organic solvents, binders, dispersants, etc. may be added to the powder particle such as barium titanate ($BaTiO_3$) or the like according to purposes of the present disclosure.

Referring to FIG. 3, the body 110 may include a capacitance forming portion disposed inside the body 110 and forming capacitance by including the first internal electrode 121 and the second internal electrode 122 disposed to oppose each other with the dielectric layer 111 interposed therebetween and cover portions 112 and 113 formed on upper and lower surfaces of the capacitance forming portion.

In addition, the capacitance forming portion is a portion contributing to capacitance formation of the capacitor and may be formed by repeatedly stacking a plurality of first and second internal electrodes 121 and 122 with the dielectric layer 111 interposed therebetween.

The cover portions 112 and 113 may include an upper cover portion 112 disposed above the capacitance forming portion in the first direction and a lower cover portion 113 disposed below the capacitance forming portion in the first direction.

The upper cover portion 112 and the lower cover portion 113 may be formed by stacking a single dielectric layer or two or more dielectric layers on the upper and lower surfaces of the capacitance forming portion in the thickness direction, respectively, and basically play a role in preventing damage to the internal electrodes due to physical or chemical stress.

The upper cover portion 112 and the lower cover portion 113 do not include an internal electrode and may include the same material as that of the dielectric layer 111.

A thickness tc of the upper and lower cover portions 112 and 113 does not need to be particularly limited and may be adjusted to prevent damage to the internal electrodes.

The internal electrodes 121 and 122 may be alternately disposed with the dielectric layer 111.

The internal electrodes 121 and 122 may include first and second internal electrodes 121 and 122. The first and second internal electrodes 121 and 122 may be alternately disposed to oppose each other with the dielectric layer 111 constituting the body 110 interposed therebetween, and may be in contact with the first and second external electrodes 131 and 132 on the third and fourth surfaces 3 and 4 of the body 110, respectively.

Referring to FIG. 3, the first internal electrode 121 may be spaced apart from the fourth surface 4 and may be in contact with the first external electrode 131 on the third surface 3, and the second internal electrode 122 may be spaced apart from the third surface 3 and may be in contact with the second external electrode 132 on the fourth surface 4.

Here, the first and second internal electrodes 121 and 122 may be electrically separated from each other by the dielectric layer 111 disposed therebetween.

The body 110 may be formed by stacking a ceramic green sheet on which the first internal electrode 121 is printed and a ceramic green sheet on which the second internal electrode 122 is printed and subsequently sintering the stack.

The conductive metals included in the internal electrodes 121 and 122 may be one or more of nickel (Ni), copper (Cu), palladium (Pd), silver (Ag), gold (Au), platinum (Pt), tin (Sn), tungsten (W), titanium (Ti), and alloys thereof, but the present disclosure is not limited thereto.

In addition, the internal electrodes 121 and 122 may be formed by printing a conductive paste on a ceramic green sheet, and as a method of printing a conductive paste for internal electrodes, a screen printing method or a gravure printing method may be used, but the present disclosure is not limited thereto.

The multilayer electronic component 1000 according to an exemplary embodiment in the present disclosure may include the first and second external electrodes 131 and 132 disposed on the body 110.

Referring to FIG. 3, the first external electrode 131 may be in contact with the first internal electrode 121 on the third surface 3, and the second external electrode 132 may be in contact with the second internal electrode 122 on the fourth surface 4. Accordingly, the first external electrode 131 may be disposed on the third surface 3 of the body 110, and the second external electrode 132 may be disposed on the fourth surface 4 of the body 110.

The first and second external electrodes 131 and 132 may be formed of a material that may have electrical conductivity, such as metal, and specific materials may be determined in consideration of electrical characteristics and structural stability, and furthermore, the first and second external electrodes 131 and 132 may be disposed on a plurality of surfaces of the body 110.

For example, the first external electrode 131 may be disposed on the third surface 3 and extend to a portion of at least one of the first and second surfaces 1 and 2, and the second external electrode 132 may be disposed on the fourth surface 4 and extend to a portion of at least one of the first and second surfaces 1 and 2.

However, the present disclosure is not limited thereto, and the first external electrode 131 may be disposed on the third surface 3 and extend to a portion of at least one of the first, second, fifth, and sixth surfaces 1, 2, 5, and 6 of the body 110, and the second external electrode 132 may be disposed on the fourth surface 4 and extend to a portion of at least one of the first, second, fifth, and sixth surfaces 1, 2, 5, and 6 of the body 110.

Accordingly, the first external electrode 131 may be in contact with the first internal electrode 121 on the third surface 3, and the second external electrode 132 may contact the second internal electrode 122 on the fourth surface 4.

According to the above configuration, when a predetermined voltage is applied to the first and second external electrodes 131 and 132, electrical charges are accumulated between the first and second internal electrodes 121 and 122.

In this case, capacitance of the capacitor 100 is proportional to the area of the first and second internal electrodes 121 and 122 overlapping each other in the stacking direction in the capacitance forming portion.

Referring to FIGS. 5 and 6, the multilayer electronic component 1000 according to an exemplary embodiment in the present disclosure may include a first metal frame 141 disposed on the first external electrode 131 of the capacitor 100 and a second metal frame 142 disposed on the second external electrode 132 of the capacitor 100 to secure a gap between the capacitor 100 and a substrate (not shown) and prevent stress from the substrate from being transmitted directly to the capacitor 100, thereby improving the thermal reliability, mechanical reliability, and bending deformation resistance of the multilayer electronic component 1000.

The first and second metal frames 141 and 142 may include support portions 141a and 142a, extension portions 141b and 142b, and mounting portions 141c and 142c.

In this case, electrical and physical connectivity of the first and second external electrodes 131 and 132 and the first and second metal frames 141 and 142 may be further improved by including a conductive adhesive portion (not shown) between the first and second external electrodes 131 and 132 and the support portions 141a and 142a.

The conductive adhesive portion may be formed of high-temperature solder or a conductive bonding material, but the present disclosure is not limited thereto.

Meanwhile, in order for the support portions 141a and 142a of the first and second metal frames 141 and 142 to be more strongly coupled to the first and second external electrodes 131 and 132, the metal frames 141 and 142 may further include a prop portion extending from the support portions 141a and 142a to a portion of at least one of the first, second, fifth, and sixth surfaces.

The support portions 141a and 142a are portions in contact with the first and second external electrodes 131 and 132, and may electrically and physically connect the first and second external electrodes 131 and 132 and the first and second metal frames 141 and 142 to each other.

The extension portions 141*b* and 142*b* may extend in the first direction from the support portions 141*a* and 142*a* and may be disposed to be spaced apart from the body 110 and the first and second external electrodes 131 and 132.

Therefore, since the metal frames 141 and 142 include the extension portions 141*b* and 142*b*, the capacitor 100 may be disposed to be spaced apart from a mounting surface, so that vibrations generated by a piezoelectric phenomenon in the capacitor may be reduced to reduce acoustic noise.

The mounting portions 141*c* and 142*c* may be disposed to extend from one end of the extension portions 141*b* and 142*b* to the extension portions 141*b* and 142*b* in the second direction.

Therefore, the multilayer electronic component 1000 may be stably mounted on the substrate to increase adhesion strength of the multilayer electronic component 1000 and at the same time heat or vibrations transferred from the substrate may be absorbed to reduce a possibility of damage to the capacitor 100.

Meanwhile, a material of the metal frame is not particularly limited.

In the multilayer electronic component 2000 according to a comparative example of FIG. 4, a size L of a capacitor 100' in the second direction is greater than a size W of the capacitor 100' in the third direction.

In the related art, there has been attempted that, as in the multilayer electronic component 2000 according to the comparative example, first and second metal frames 141' and 142' are disposed on the first and second external electrodes 131' and 132' of the capacitor 100' so that stress from a substrate is not transmitted directly to the capacitor 100'.

However, since the size L of the capacitor 100' in the second direction is larger than the size W of the capacitor 100' in the third direction, a current path increases to make it difficult to reduce equivalent series inductance (ESL), so the capacitor 100' has high impedance value in high frequencies.

In addition, this problem further increases the current path as the metal frames 141' and 142' are disposed on the capacitor 100', and as a result, the multilayer electronic component 2000 has a high impedance value at high frequencies.

Referring to FIG. 2, in the capacitor 100 according to an exemplary embodiment in the present disclosure, when the size of the capacitor 100 in the second direction is L and the size of the capacitor 100 in the third direction is W, W>L may be satisfied.

Accordingly, a distance between the external electrodes 131 and 132 arranged in the second direction may be narrowed to reduce the current path, thereby reducing ESL of the capacitor 100 and allowing the capacitor 100 to have a low impedance value at high frequencies.

Meanwhile, in the capacitor 100 according to an exemplary embodiment in the present disclosure satisfying W>L, the length of the external electrodes 131 and 132 in contact with the substrate may increase to cause a problem in which the possibility of damage to the capacitor 100 increases due to substrate deformation.

Referring to FIG. 5, the multilayer electronic component 1000 according to an exemplary embodiment in the present disclosure may include the first metal frame 141 disposed on the first external electrode 131 of the capacitor 100 and the second metal frame 142 disposed on the second external electrode 132 of the capacitor 100.

Accordingly, the first and second metal frames 141 and 142 may suppress direct transmission of thermal or mechanical deformation occurring in the substrate to the capacitor 100, thereby improving the durability of the capacitor 100 with respect to the mounting substrate.

Figure 7:
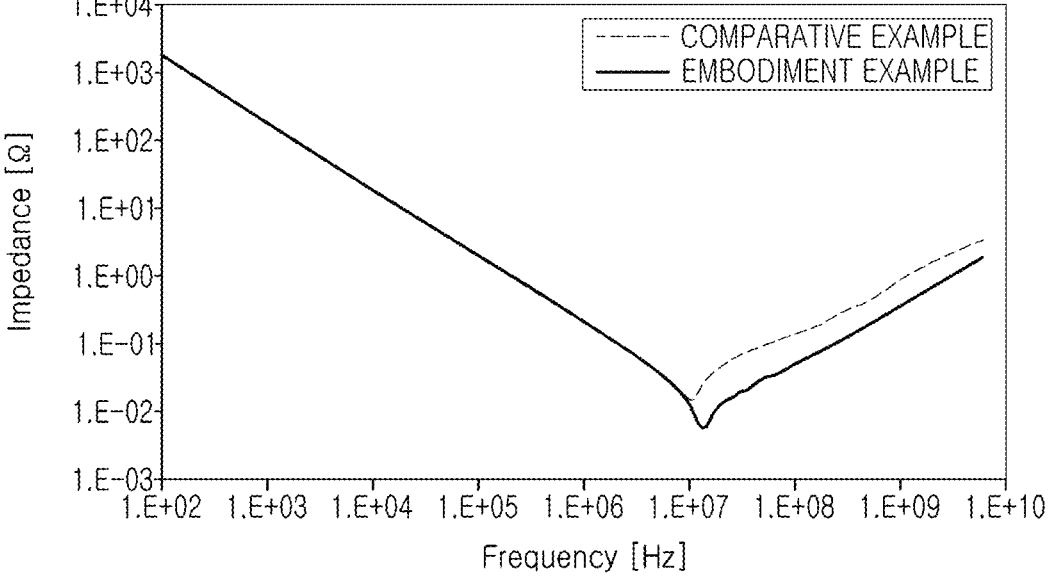
FIG. 7 is a graph illustrating impedance values of a multilayer electronic component according to an embodiment example in the present disclosure and a multilayer electronic component according to the comparative example according to frequencies.

FIG. 7 is a graph illustrating impedance values of the multilayer electronic component 1000 according to an embodiment example in the present disclosure and the multilayer electronic component 2000 according to the comparative example over frequencies.

Specifically, in the embodiment example of the multilayer electronic component 1000 according to an exemplary embodiment, W is 20 μm, L is 12 μm, and W/L is 1.67, which satisfies W>L.

In contrast, in the comparative example, W is 12 μm, L is 20 μm, and W/L is 0.60, which does not satisfy W>L.

In the case of the embodiment example, a magnitude of impedance at 100 MHZ corresponds to 0.05Ω, and in the case of the comparative example, a magnitude of impedance corresponds to 0.13Ω, and thus, it can be seen that the magnitude of the impedance of the exemplary embodiment is less in a high frequency region than the magnitude of the impedance of the comparative example.

Accordingly, in the multilayer electronic component 1000 according to an exemplary embodiment in the present disclosure, since W>L is satisfied, ESL may be reduced through the reduction of the current path, thereby providing the multilayer electronic component having low impedance.

In the case of a multilayer electronic component including a metal frame, vibrations and heat of the substrate are transferred to the capacitor through the metal frame.

In addition, when bending occurs in the substrate, the mounting portion in which the substrate and the metal frame are in contact with each other may also be bent due to bending strength.

In addition, if the size W of the capacitor 100 of the multilayer electronic component 1000 in the third direction is increased to reduce ESL, a length or area in which the metal frame is in contact with the substrate also increases, causing a problem in which distortion of the multilayer electronic component 1000 increases due to the bending of the substrate.

Therefore, a multilayer electronic component including a metal frame, which reduces a current path to reduce ESL, protects a capacitor from thermal and mechanical stress transmitted along the metal frame from a substrate, and has robust characteristics against deformation due to bending of the substrate, is required.

Hereinafter, various modifications of the multilayer electronic component 1000 according to an exemplary embodiment in the present disclosure will be described, but descriptions overlapping those of the multilayer electronic component 1000 according to an exemplary embodiment in the present disclosure will be omitted.

Modification Example 1

Figure 8:
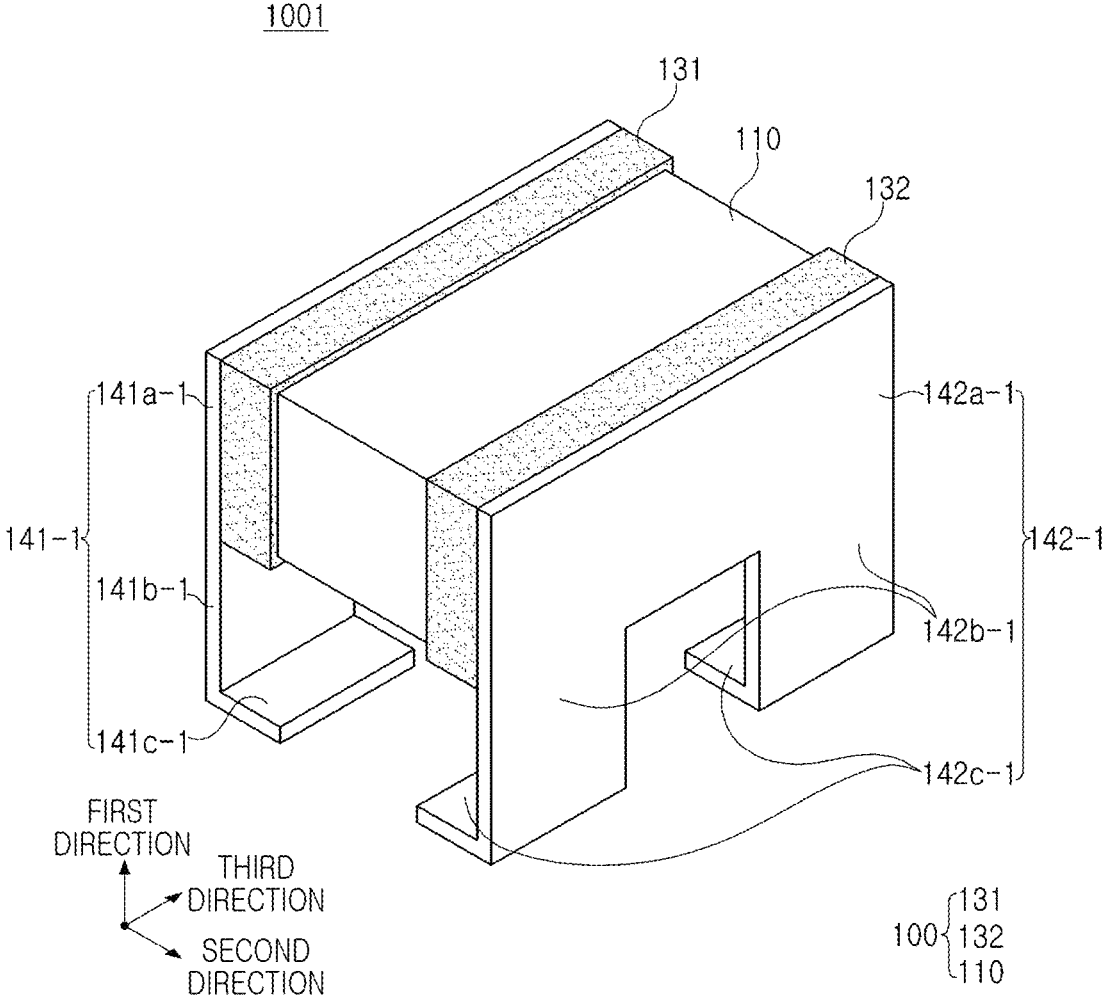
FIG. 8 is a perspective view schematically illustrating modification example 1 of a multilayer electronic component according to an exemplary embodiment in the present disclosure.

FIG. 8 is a perspective view schematically illustrating modification example 1 1001 of the multilayer electronic component 1000 according to an exemplary embodiment in the present disclosure.

Referring to FIG. 8, the modification example 1 1001 of the multilayer electronic component 1000 according to an exemplary embodiment in the present disclosure may include first and second metal frames 141-1 and 142-1 disposed on the external electrodes 131 and 132.

The first and second metal frames 141-1 and 142-1 may include support portions 141a-1 and 142a-1, extension portions 141b-1 and 142b-1, and mounting portions 141c-1 and 142c-1.

In this case, the extension portions 141b-1 and 142b-1 may be separately disposed in both directions of the third direction. Accordingly, the extension portions 141b-1 and 142b-1 may have a shape separated in both directions of the third direction with a space therebetween. Accordingly, since transmission of heat and vibrations occurring in a substrate is blocked by the space therebetween, the multilayer electronic component 1001 may be effectively protected from the heat and vibrations of the substrate.

In an exemplary embodiment, the mounting portions 141c-1 and 142c-1 may be separately disposed in both directions of the third direction. Accordingly, the mounting portions 141c-1 and 142c-1 may have a shape separated in both directions of the third direction with a space therebetween. Accordingly, when bending occurs in the substrate, direct transmission of bending stress to the multilayer electronic component 1001 is suppressed, thereby improving bending strength of the multilayer electronic component 1001.

Modification Example 2

Figure 9:
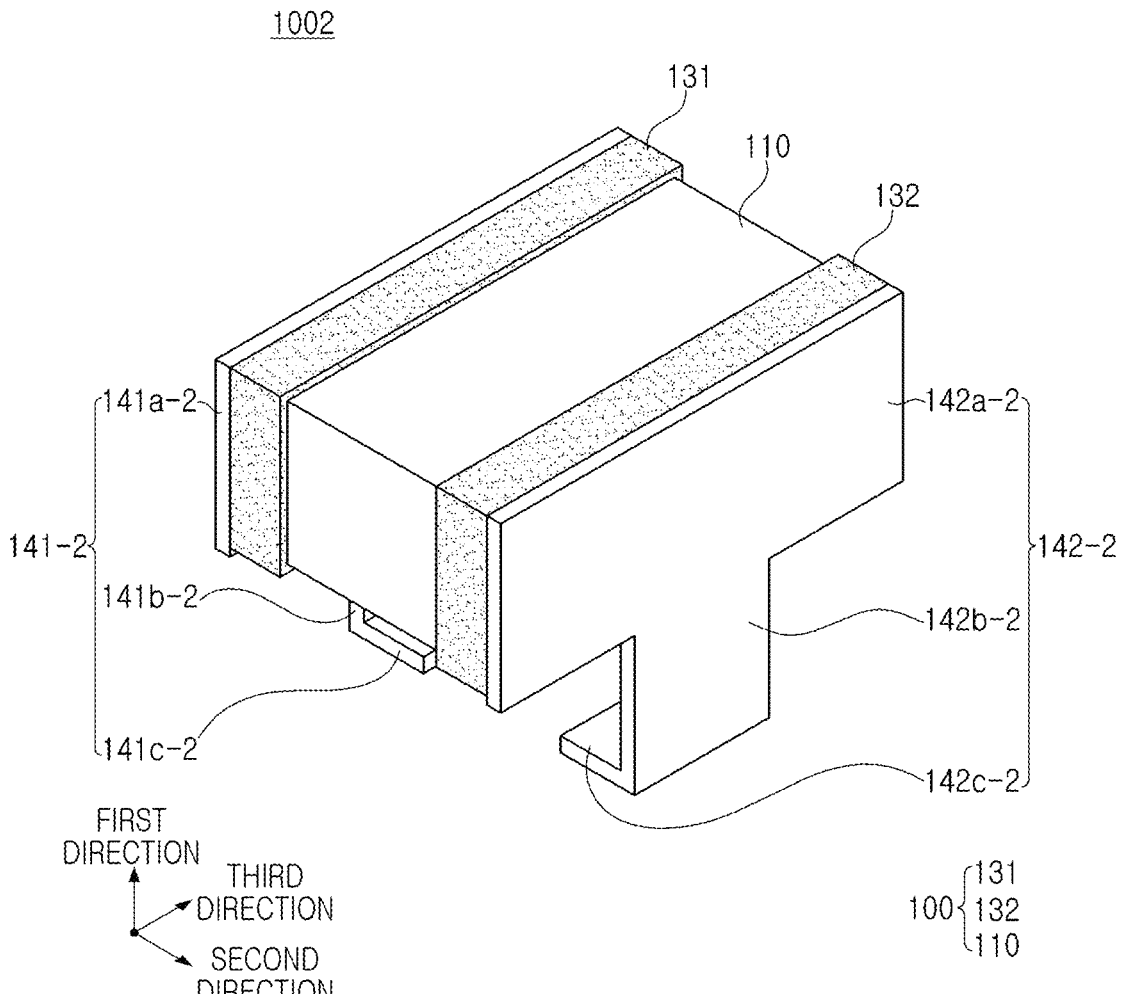
FIG. 9 is a perspective view schematically illustrating modification example 2 of a multilayer electronic component according to an exemplary embodiment in the present disclosure.

FIG. 9 is a perspective view schematically illustrating a modification example 2 1002 of the multilayer electronic component 1000 according to an exemplary embodiment in the present disclosure.

In the case of a multilayer electronic component using a metal frame, if a position and direction of the metal frame deviates from a regular position on the design when mounted on a substrate, an end of a mounting portion of the metal frame may contact another land pattern adjacent thereto to cause a short circuit defect between components.

Referring to FIG. 9, the modification example 2 1002 of the multilayer electronic component 1000 according to an exemplary embodiment in the present disclosure may include first and second metal frames 141-2 and 142-2 disposed on the external electrodes 131 and 132.

The first and second metal frames 141-2 and 142-2 may include support portions 141a-2 and 142a-2, extension portions 141b-2 and 142b-2, and mounting portions 141c-2 and 142c-2.

In an exemplary embodiment, a size of the extension portions 141b-2 and 142b-2 in the third direction may be smaller than a size of the support portions 141a-2 and 142a-2 in the third direction. Accordingly, the area in which heat and vibrations of the substrate are transmitted may be reduced, thereby effectively protecting the multilayer electronic component 1002 from heat and vibrations of the substrate.

In this case, the size of the mounting portions 141c-2 and 142c-2 in the third direction may be substantially the same as the size of the extension portions 141b-2 and 142b-2 in the third direction. In one example, a first size being substantially the same as a second size may mean that the first and second sizes are exactly the same, or may mean that the first size is substantially the same as the second size in consideration of an error, margin, or tolerance, which may occur in measurement or in manufacturing, appreciated by one of ordinary skill in the art. Accordingly, even if positions of the metal frames 141-2 and 142-2 are distorted when the multilayer electronic component 1002 is mounted on the substrate, the mounting portions 141c-2 and 142c-2 may be prevented from contacting other land patterns adjacent thereto, and thus, an occurrence of short-circuit defects between components mounted on the substrate may be prevented.

Modification Example 3

Figure 10:
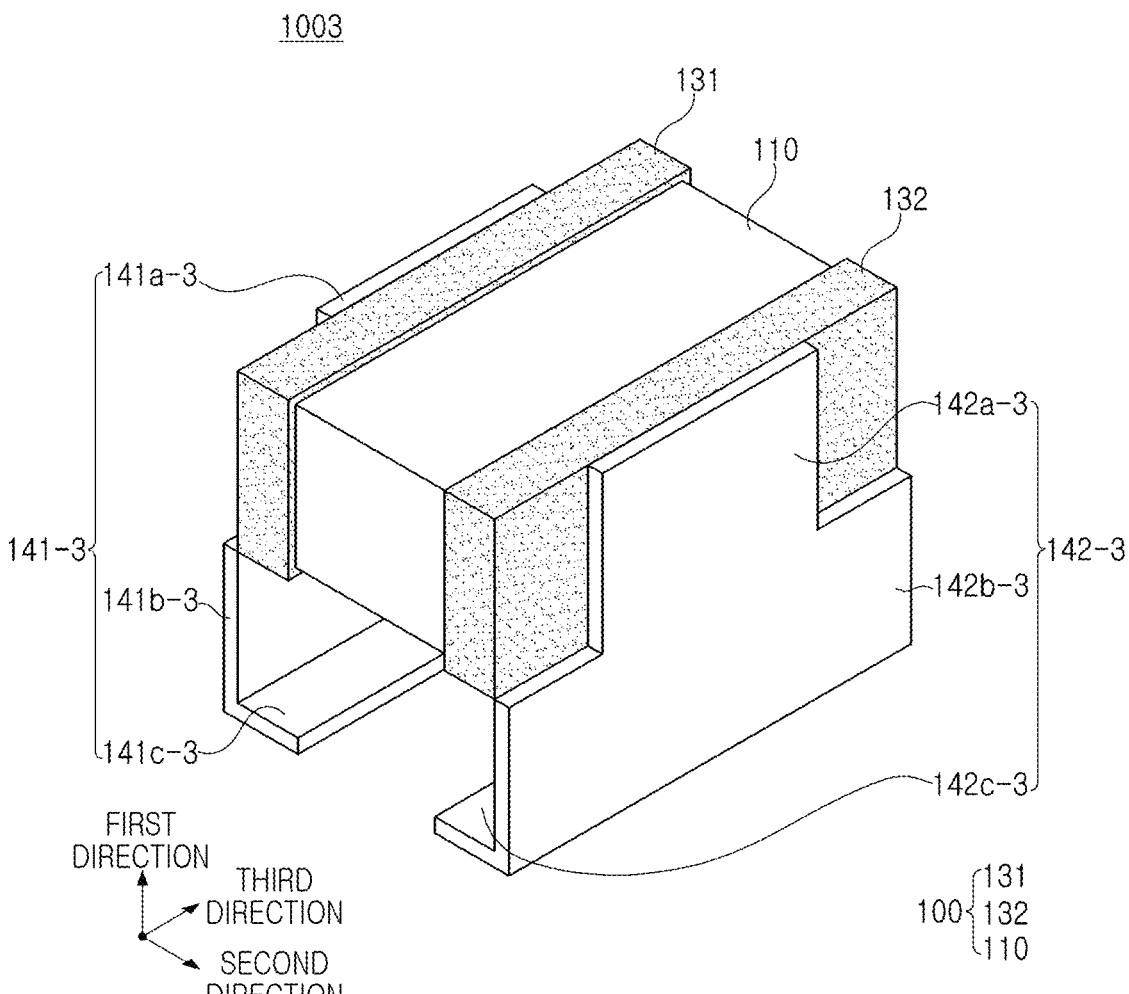
FIG. 10 is a perspective view schematically illustrating modification example 3 of a multilayer electronic component according to an exemplary embodiment in the present disclosure.

FIG. 10 is a perspective view schematically illustrating a modification example 3 1003 of the multilayer electronic component 1000 according to an exemplary embodiment in the present disclosure.

In the case of a multilayer electronic component using a metal frame, when the metal frame covers the entire surface of the external electrode, the degree of transmission of vibrations and heat from the substrate may increase and it may be difficult to protect the capacitor 100 from heat and vibrations.

Referring to FIG. 10, the modification example 3 1003 of the multilayer electronic component 1000 according to an exemplary embodiment in the present disclosure may include first and second metal frames 141-3 and 142-3 disposed on the external electrodes 131 and 132.

The first and second metal frames 141-3 and 142-3 may include support portions 141a-3 and 142a-3, extension portions 141b-3 and 142b-3, and mounting portions 141c-3 and 142c-3.

At this time, a size of the support portions 141a-3 and 142a-3 in the third direction may be smaller than the size W of the capacitor 100 in the third direction to reduce transmission of heat, vibrations, and bending stress from the substrate through the metal frames 141-3 and 142-3, thereby improving thermal and mechanical reliability and resistance to bending deformation.

In this case, the size of the support portions 141a-3 and 142a-3 in the third direction may be smaller than the size of the extension portions 141b-3 and 142b-3 in the third direction. More preferably, in addition to this, the size of the mounting portions 141c-3 and 142c-3 in the third direction may be substantially the same as the size of the extension portions 141b-3 and 142b-3 in the third direction. Accordingly, a length or area of the mounting portions 141c-3 and 142c-3 in contact with the substrate may be increased, and thus, adhesion strength of the multilayer electronic component 1003 may be increased.

Modification Example 4

Figure 11:
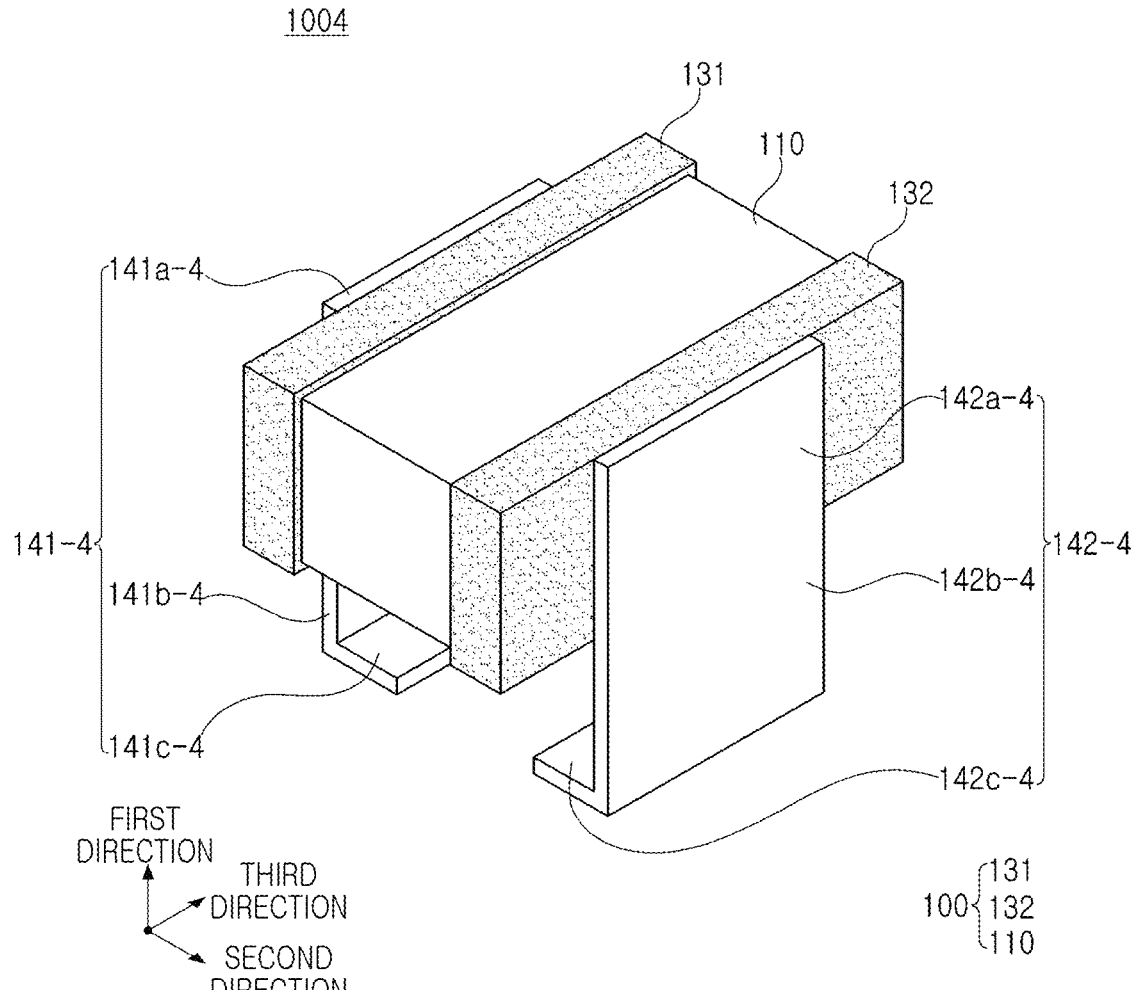
FIG. 11 is a perspective view schematically illustrating modification example 4 of a multilayer electronic component according to an exemplary embodiment in the present disclosure.

FIG. 11 is a perspective view schematically illustrating a modification example 4 1004 of the multilayer electronic component 1000 according to an exemplary embodiment in the present disclosure.

Referring to FIG. 11, the modification example 4 1004 of the multilayer electronic component 1000 according to an exemplary embodiment in the present disclosure may include first and second metal frames 141-4 and 142-4 disposed on the external electrodes 131 and 132.

The first and second metal frames 141-4 and 142-4 may include support portions 141a-4 and 142a-4, extension portions 141b-4 and 142b-4, and mounting portions 141c-4 and 142c-4.

In an exemplary embodiment, a size of the support portions 141a-4 and 142a-4 in the third direction may be smaller than the size W of the capacitor 100 in the third direction to reduce the degree of transmission of heat, vibrations and bending stress transmitted through the metal frames 141-4 and 142-4 from the substrate to the capacitor 100, thereby improving thermal and mechanical reliability and resistance to bending deformation.

In an exemplary embodiment, a size of the extension portions 141*b*-4 and 142*b*-4 in the third direction may be substantially the same as a size of the support portions 141*a*-4 and 142*a*-4 in the third direction. Accordingly, an area in which heat and vibrations are transmitted from the substrate may be reduced to thereby effectively protect the multilayer electronic component 1004 from the heat and vibrations of the substrate.

In an exemplary embodiment, a size of the mounting portions 141*c*-4 and 142*c*-4 in the third direction may be substantially the same as the size of the extension portions 141*b*-4 and 142*b*-4 in the third direction. Accordingly, even if positions of the metal frames 141-4 and 142-4 are distorted when the multilayer electronic component 1004 is mounted on the substrate, the mounting portions 141*c*-4 and 142*c*-4 may be prevented from contacting other land patterns adjacent thereto, and thus, an occurrence of short-circuit defects between components mounted on the substrate may be prevented.

Modification Example 5

Figure 12:
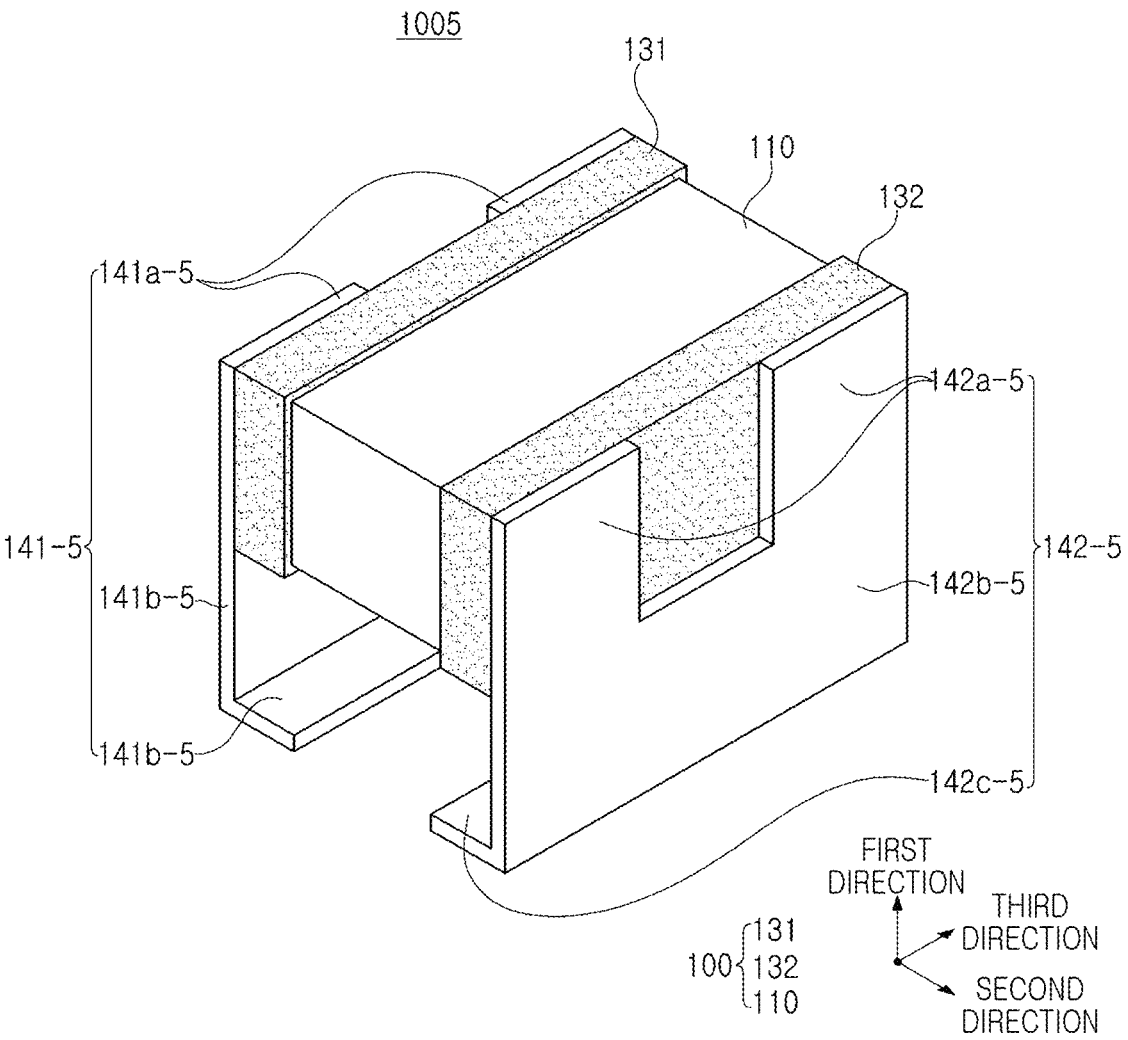
FIG. 12 is a perspective view schematically illustrating a modification example 5 of a multilayer electronic component according to an exemplary embodiment in the present disclosure.

FIG. 12 is a perspective view schematically illustrating a modification example 5 1005 of the multilayer electronic component 1000 according to an exemplary embodiment in the present disclosure.

Referring to FIG. 12, the modification example 5 1005 of the multilayer electronic component 1000 according to an exemplary embodiment in the present disclosure may include first and second metal frames 141-5 and 142-5 disposed on the external electrodes 131 and 132.

The first and second metal frames 141-5 and 142-5 may include support portions 141*a*-5 and 142*a*-5, extension portions 141*b*-5 and 142*b*-5, and mounting portions 141*c*-5 and 142*c*-5.

In an exemplary embodiment, the support portions 141*a*-5 and 142*a*-5 may be separately disposed in both directions of the third direction. Accordingly, the degree of heat, vibrations, and bending stress transferred from the substrate along the metal frames 141-5 and 142-5 to the capacitor 100 may be reduced to improve thermal and mechanical reliability and resistance to bending deformation.

Modification Example 6

Figure 13:
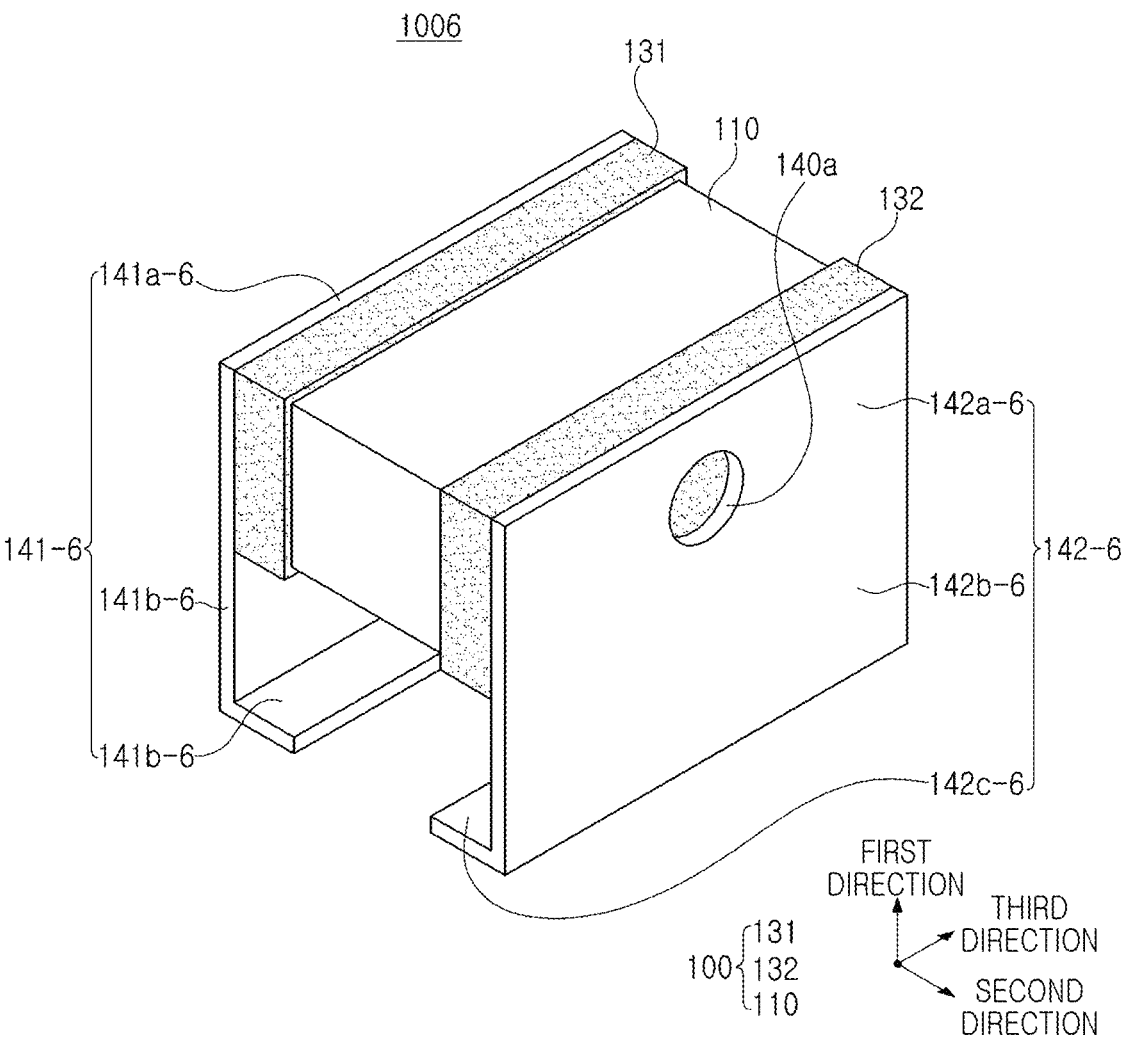
FIG. 13 is a perspective view schematically illustrating modification example 6 of a multilayer electronic component according to an exemplary embodiment in the present disclosure.

FIG. 13 is a perspective view schematically illustrating a modification example 6 1006 of the multilayer electronic component 1000 according to an exemplary embodiment in the present disclosure.

Referring to FIG. 13, the modification example 6 1006 of the multilayer electronic component 1000 according to an exemplary embodiment in the present disclosure may include first and second metal frames 141-6 and 142-6 disposed on the external electrodes 131 and 132.

The first and second metal frames 141-6 and 142-6 may include support portions 141*a*-6 and 142*a*-6, extension portions 141*b*-6 and 142*b*-6, and mounting portions 141*c*-6 and 142*c*-6.

In an exemplary embodiment, the support portions 141*a*-6 and 142*a*-6 may include a recess portion 140*a*. The recess portion 140*a* may reduce the degree of transmission of vibrations or heat along the metal frames 141-6 and 142-6, and by disposing a conductive adhesive in the recess portion 140*a*, an adhesive force between the metal frames 141-6 and 142-6 and the external electrodes 131 and 132 may be improved.

In an exemplary embodiment, the recess portion 140*a* may be disposed to be spaced apart from the ends of the support portions 141*a*-6 and 142*a*-6 in the first direction and in the third direction, but is not limited thereto.

In addition, the recess portion 140*a* may be disposed to pass through the metal frame so that the external electrode is exposed, and the conductive adhesive may be disposed on the exposed surface of the external electrode.

In this case, the recess portion 140*a* may be 50% or less of the area of the external electrode in a direction in contact with the metal frame so that the metal frame and the capacitor may be sufficiently bonded.

Modification Example 7

Figure 14:
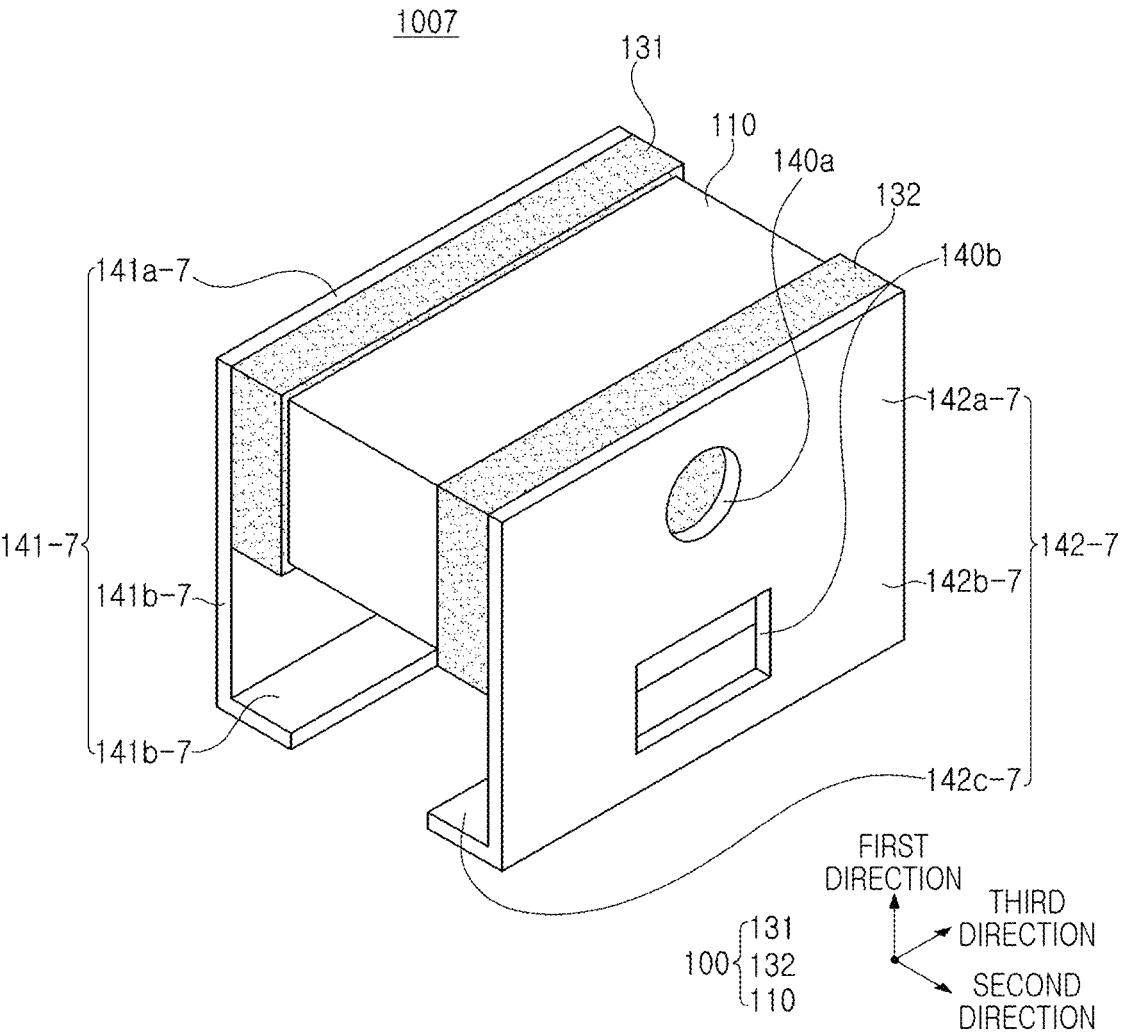
FIG. 14 is a perspective view schematically illustrating modification example 7 of a multilayer electronic component according to an exemplary embodiment in the present disclosure.

FIG. 14 is a perspective view schematically illustrating a modification example 7 1007 of the multilayer electronic component 1000 according to an exemplary embodiment in the present disclosure.

Referring to FIG. 14, the modification example 7 1007 of the multilayer electronic component 1000 according to an exemplary embodiment in the present disclosure may include first and second metal frames 141-7 and 142-7 disposed on the external electrodes 131 and 132.

The first and second metal frames 141-7 and 142-7 may include support portions 141*a*-7 and 142*a*-7, extension portions 141*b*-7 and 142*b*-7, and mounting portions 141*c*-7 and 142*c*-7.

The support portions 141*a*-7 and 142*a*-7 may include a recess portion 140*a*, and the extension portions 141*b*-7 and 142*b*-7 may include a through portion 140*b*.

The through portion 140*b* may be disposed to be spaced apart from the ends of the extension portions 141*b*-7 and 142*b*-7 in the first and third directions, and may be disposed to pass through the extension portion.

Accordingly, heat and vibrations transmitted from the substrate may be effectively reduced, while the strength of the metal frame is maintained.

Hereinafter, a multilayer electronic component according to an exemplary embodiment in the present disclosure will be described, but descriptions overlapping with the multilayer electronic component and various modifications according to an exemplary embodiment in the present disclosure will be omitted.

Figure 15:
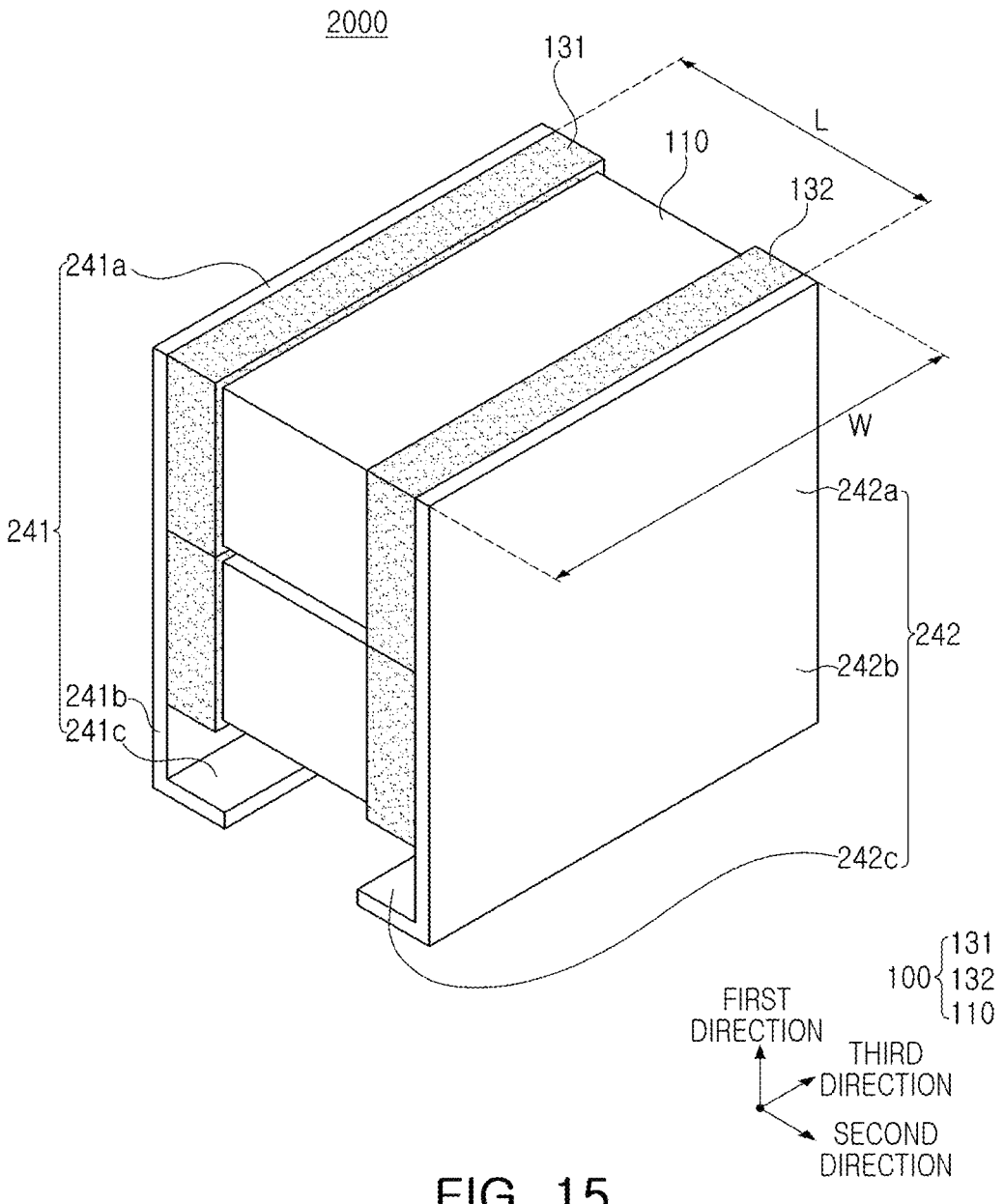
FIG. 15 is a perspective view schematically illustrating a multilayer electronic component according to an exemplary embodiment in the present disclosure.

FIG. 15 is a perspective view schematically illustrating a multilayer electronic component 2000 according to an exemplary embodiment in the present disclosure.

Referring to FIG. 15, a multilayer electronic component 2000 according to an exemplary embodiment may include a plurality of capacitors 100. Specifically, the multilayer electronic component 2000 may have a structure in which the plurality of capacitors 100 are arranged, and a first metal frame 241 may be disposed on the first external electrodes 131 of the plurality of capacitors 100 and a second metal frame 242 may be disposed on the second external electrode 132. That is, the first metal frame 241 may simultaneously contact each of the first external electrodes of the plurality of capacitors 100, and the second metal frame 242 may simultaneously contact each of the second external electrodes.

Even if the multilayer electronic component 2000 includes a plurality of capacitors 100, the plurality of capacitors are stacked in the first direction or the third direction, so that an increase in a distance between the first and second metal frames 241 and 242 may be minimized.

In addition, since each of the capacitors 100 has a structure in which the size Win the third direction is larger than the size L in the second direction, when stacked in the first or third direction, a size of the entire capacity array including the plurality of capacitors 100 in the third direction may be greater than that in the second direction.

Accordingly, an effect of reducing a current path may be maintained, and thus, the multilayer electronic component 2000 may be reduced in ESL and may have a low impedance value at a high frequency.

In addition, capacitance and reliability of the multilayer electronic component 2000 may be improved by bonding several tens of hundreds of capacitors 100 that are thermally stable but have a small capacity.

Meanwhile, the first and second metal frames 241 and 242 may include support portions 241*a* and 242*a* in contact with the first and second external electrodes 131 and 132 of the plurality of capacitors 100, extension portions 241*b* and 242*b* extending from the support portions in the first direction and disposed to be spaced apart from the body and the first and second external electrodes, and mounting portions 241*c* and 242*c* extending from one ends of the extension portions in the second direction so as to be disposed.

Figure 16:
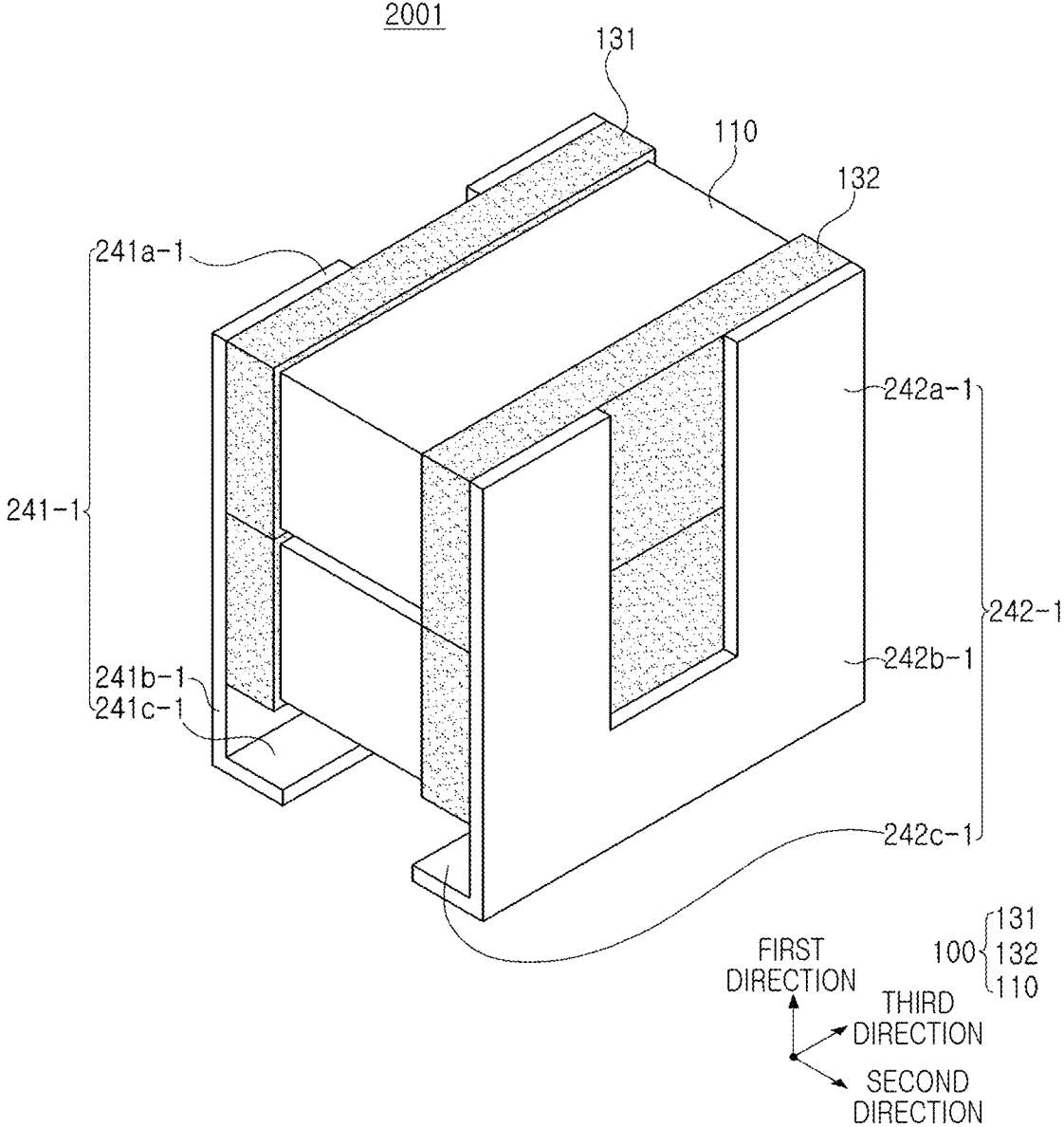
FIG. 16 is a perspective view schematically illustrating a multilayer electronic component according to an exemplary embodiment in the present disclosure.

FIG. 16 is a perspective view schematically illustrating a multilayer electronic component 2001 according to an exemplary embodiment in the present disclosure.

Referring to FIG. 16, the first and second metal frames 241-1 and 242-1 of the multilayer electronic component 2001 according to an exemplary embodiment may include support portions 241*a*-1 and 242*a*-1 in contact with the first and second external electrodes 131 and 132 of the plurality of capacitors 100, extension portions 241*b*-1 and 242*b*-1 extending from the support portions in the first direction and disposed to be spaced apart from the body and the first and second external electrodes, and mounting portions 241*c*-1 and 242*c*-1 extending from one ends of the extension portions in the second direction so as to be disposed.

In an exemplary embodiment, the support portions 241*a*-1 and 242*a*-1 of the first and second metal frames 241-1 and 242-1 may be separately disposed in both directions of the third direction. Accordingly, the degree of transmission of heat, vibrations, and bending stress transmitted from the substrate along the metal frames 241-1 and 242-1 to the plurality of capacitors 100 may be reduced to improve thermal and mechanical reliability and resistance to bending deformation.

Figure 17:
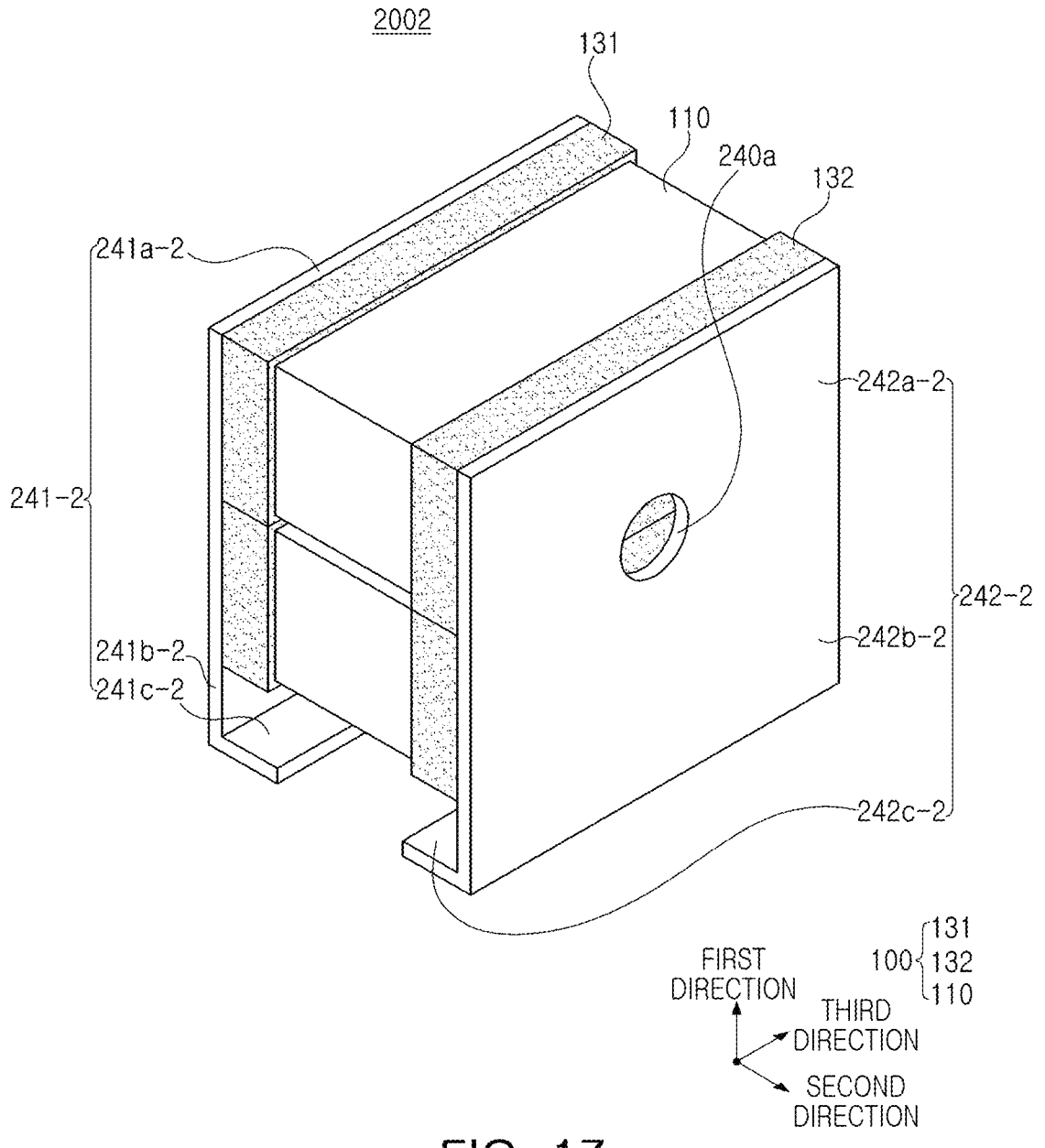
FIG. 17 is a perspective view schematically illustrating a multilayer electronic component according to an exemplary embodiment in the present disclosure.

FIG. 17 is a perspective view schematically illustrating a multilayer electronic component 2002 according to an exemplary embodiment in the present disclosure.

Referring to FIG. 17, first and second metal frames 241-2 and 242-2 of the multilayer electronic component 2002 according to an exemplary embodiment may include support portions 241*a*-2 and 242*a*-2 in contact with the first and second external electrodes 131 and 132 of the plurality of capacitors 100, extension portions 241*b*-2 and 242*b*-2 extending from the support portions in the first direction and disposed to be spaced apart from the body and the first and second external electrodes, and mounting portions 241*c*-2 and 242*c*-2 extending from one ends of the extension portions in the second direction so as to be disposed.

In an exemplary embodiment, the support portions 241*a*-2 and 242*a*-2 may include a recess portion 240*a*. The recess portion 240*a* may reduce the degree of transmission of vibrations or heat along the metal frames 241-2 and 242-2, and by disposing a conductive adhesive in the recess portion 240, an adhesive force between the metal frames 241-2 and 242-2 and the external electrodes 131 and 132 may be improved.

In an exemplary embodiment, the recess portion 240*a* may be disposed to be spaced apart from the ends of the support portions 241*a*-2 and 242*a*-2 in the first direction and in the third direction, but is not limited thereto.

In addition, the recess portion 240*a* may be disposed to pass through the metal frame so that the external electrode is exposed, and the conductive adhesive may be disposed on the exposed surface of the external electrode.

In this case, the recess portion 240*a* may be 50% or less of the area of the external electrode in a direction in contact with the metal frame so that the metal frame and the capacitor may be sufficiently bonded.

Figure 18:
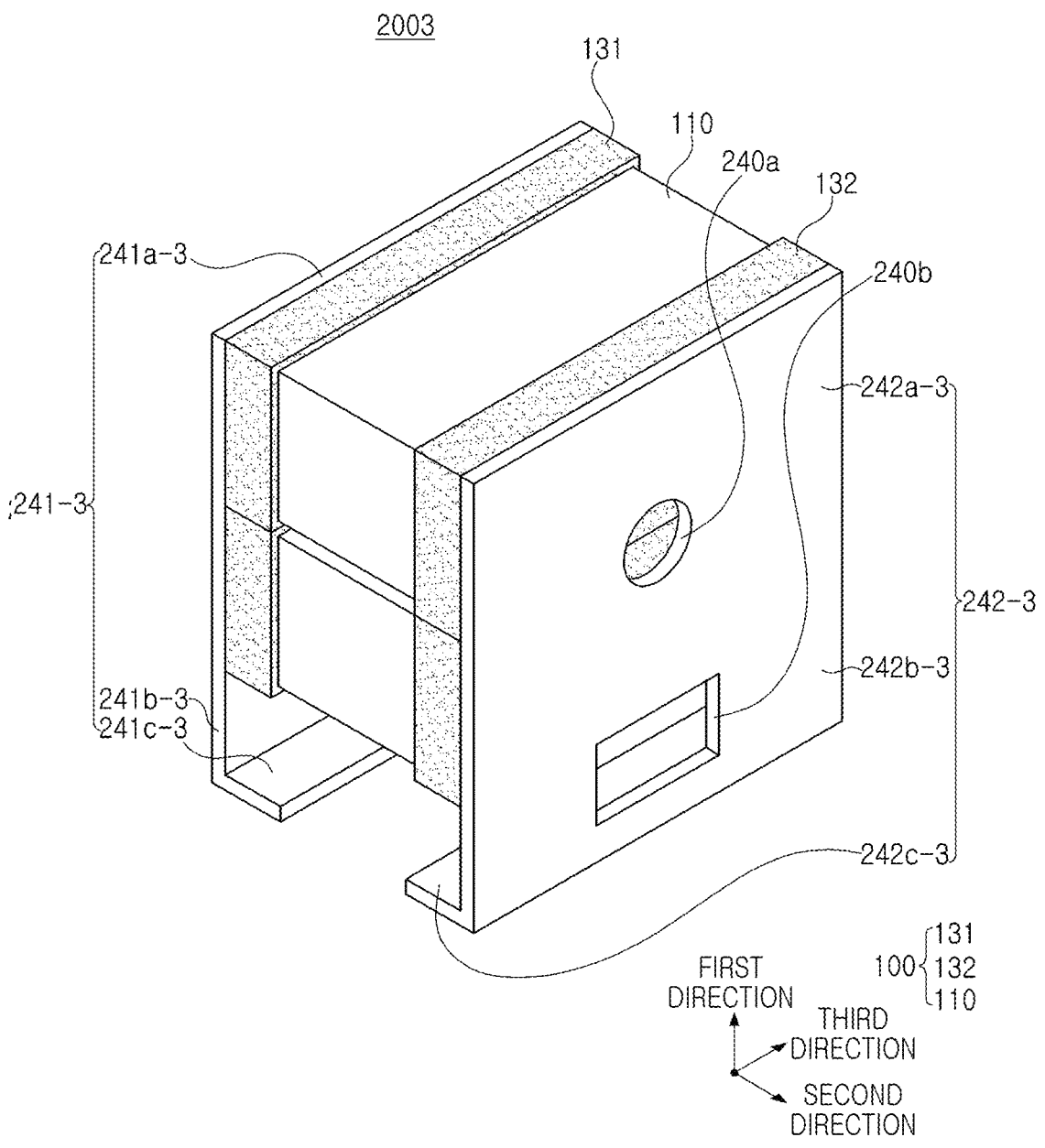
FIG. 18 is a perspective view schematically illustrating a multilayer electronic component according to an exemplary embodiment in the present disclosure.

FIG. 18 is a perspective view schematically illustrating a multilayer electronic component 2003 according to an exemplary embodiment in the present disclosure.

First and second metal frames 241-3 and 242-3 of the multilayer electronic component 2003 according to an exemplary embodiment may include support portions 241*a*-3 and 242*a*-3 in contact with the first and second external electrodes 131 and 132 of the plurality of capacitors 100, extension portions 241*b*-3 and 242*b*-3 extending from the support portions in the first direction and disposed to be spaced apart from the body and the first and second external electrodes, and mounting portions 241*c*-3 and 242*c*-3 extending from one ends of the extension portions in the second direction so as to be disposed.

In this case, the support portions 241*a*-3 and 242*a*-3 may include a recess portion 240*a*, and the extension portions 241*b*-3 and 242*b*-3 may include a through portion 240*b*.

The through portion 240*b* may be disposed to be spaced apart from the ends of the extension portions 241*b*-3 and 242*b*-3 in the first and third directions, and may be disposed to pass through the extension portion.

Accordingly, heat and vibrations transmitted from the substrate may be effectively reduced, while the strength of the metal frame is maintained.

Figure 19:
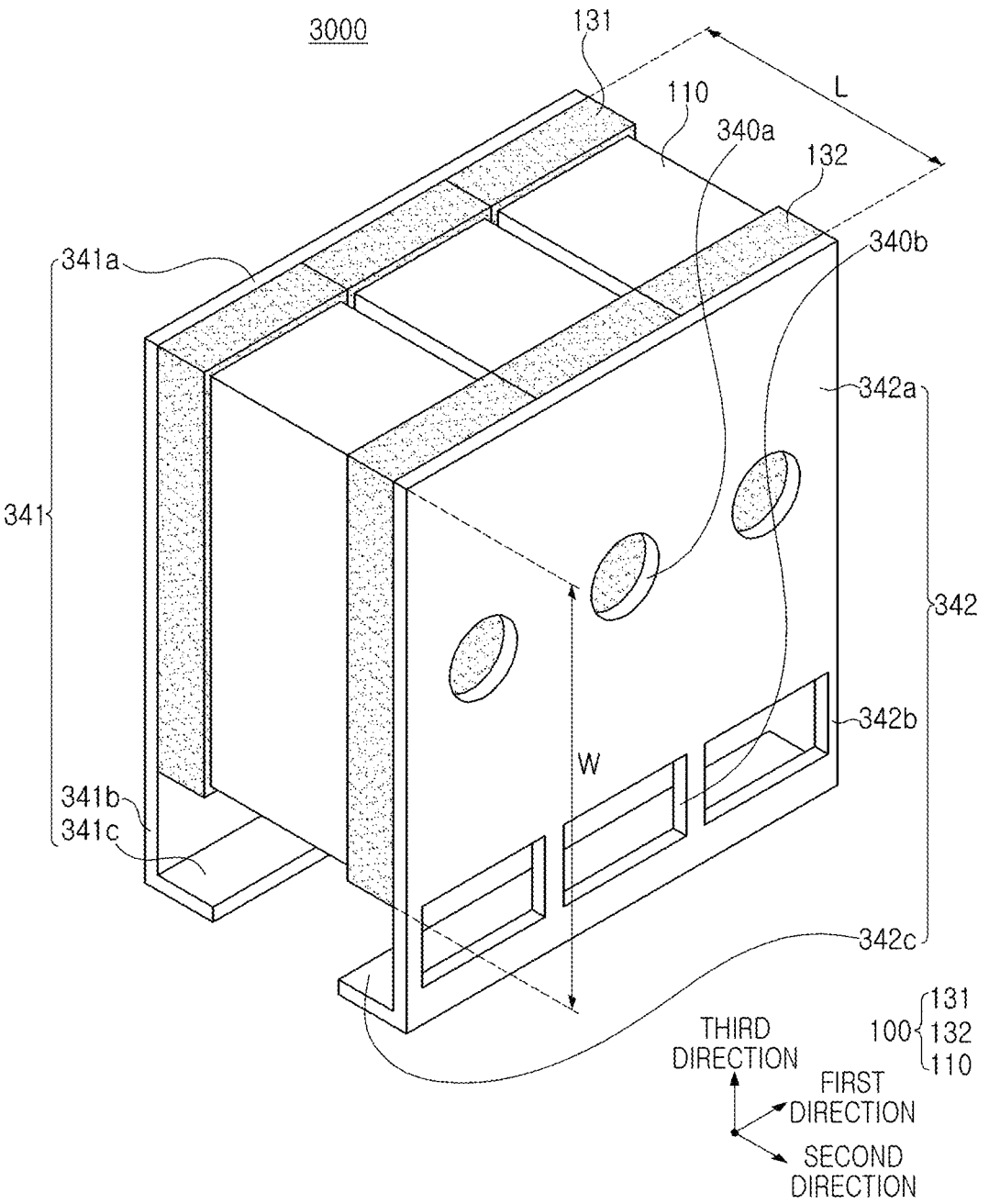
FIG. 19 is a perspective view schematically illustrating a multilayer electronic component according to an exemplary embodiment in the present disclosure.

FIG. 19 is a perspective view schematically illustrating a multilayer electronic component 3000 according to an exemplary embodiment in the present disclosure.

Referring to FIG. 19, the multilayer electronic component 3000 according to an exemplary embodiment may include a capacitor array in which a plurality of capacitors 100 are stacked in the first direction, and include first and second metal frames 341 and 342 disposed on the first and second external electrodes.

The first and second metal frames 341 and 342 may include support portions 341*a* and 342*a* in contact with the first and second external electrodes, extension portions 341*b* and 342*b* extending in the third direction and disposed to be spaced apart from the body 110 and the first and second external electrodes, and mounting portions 341*c* and 342*c* extending from one ends of the extension portions 341*b* and 342*b* in the second direction.

The support portions 341*a* and 342*a* may include a recess portion 340*a*, and the extension portions 341*b* and 342*b* may include a through portion 340*b*. Accordingly, an adhesive force between the external electrodes 131 and 132 and the metal frames 341 and 342 may be improved, strength of the metal frame may be maintained, and heat and vibrations transmitted from the substrate along the metal frames 341 and 342 may be effectively reduced.

Even if the multilayer electronic component 3000 includes a plurality of capacitors 100, since the plurality of capacitors are stacked in the first direction, an increase in a distance between the first and second metal frames 341 and 342 may be minimized.

In addition, since each of the capacitors 100 has a structure in which the size W in the third direction is larger than the size L in the second direction, when the capacitors 100 are stacked in the first direction, a size of the entire capacitor array including a plurality of capacitors 100 in the third direction may be greater than that in the second direction.

Accordingly, an effect of reducing a current path may be maintained, and thus, the multilayer electronic component 3000 may be reduced in ESL and may have a low impedance value at a high frequency.

In addition, capacitance and reliability of the multilayer electronic component 3000 may be improved by bonding several tens of hundreds of capacitors 100 that are thermally stable but have a small capacity.

Meanwhile, a plurality of the recess portions 340*a* and a plurality of through portions 340*b* may be formed according to the number of the arranged capacitors 100. Accordingly, in an exemplary embodiment, the support portions 341*a* and 342*a* may include a plurality of recess portions, and the extension portions 341*b* and 342*b* may include a plurality of through portions. Accordingly, an adhesive force between the metal frames 341 and 342 and the capacitor 100 may be improved, and heat and vibrations transmitted from the substrate to the capacitor array may be effectively suppressed.

As set forth above, one of several effects of the present disclosure is to protect a multilayer ceramic capacitor from thermal and mechanical stress transmitted from a substrate.

One of several effects of the present disclosure is to reduce ESL by shortening a current path.

One of several effects of the present disclosure is to reduce ESL by reducing a current path when a metal frame is bonded to protect a multilayer ceramic capacitor from thermal and mechanical stress transmitted from the substrate.

Various and beneficial advantages and effects of the present disclosure are not limited to the above, and will be more easily understood in the course of describing specific exemplary embodiments of the present disclosure.

While exemplary embodiments have been shown and described above, it will be apparent to those skilled in the art that modifications and variations could be made without departing from the scope of the present disclosure as defined by the appended claims.

What is claimed is:

1. A multilayer electronic component comprising:
a capacitor including a body comprising a dielectric layer and first and second internal electrodes alternately disposed with the dielectric layer therebetween and including first and second surfaces opposing each other in a first direction, third and fourth surfaces connected to the first and second surfaces and opposing each other in a second direction, and fifth and sixth surfaces connected to the first to fourth surfaces and opposing each other in a third direction, a first external electrode disposed on the third surface of the body, and a second external electrode disposed on the fourth surface of the body;
a first metal frame disposed on the first external electrode of the capacitor; and
a second metal frame disposed on the second external electrode of the capacitor,
wherein W>L in which L is a dimension of the capacitor in the second direction and W is a dimension of the capacitor in the third direction, the first and second metal frames include support portions connected to the first and second external electrodes, extension portions extending from the support portions in the first direction and disposed to be spaced apart from the body and the first and second external electrodes, and mounting portions extending from one ends of the extension portions in the second direction,
a size of the support portion of the first metal frame in the third direction is greater than a size of the first internal electrode in the third direction,
a size of the extension portion of the first metal frame in the third direction is smaller than the size of an entirety of the support portion of the first metal frame in the third direction,
the size of the support portions in the first direction and a size of the first and second external electrodes in the first direction are substantially the same along the third direction, and
a size of the mounting portion of the first metal frame in the third direction is substantially the same as the size of the extension portion of the first metal frame in the third direction.

2. The multilayer electronic component of claim 1, wherein
the first external electrode of the capacitor is disposed on the third surface and extends to a portion of at least one of the first and second surfaces, and
the second external electrode of the capacitor is disposed on the fourth surface and extends to be disposed on a portion of at least one of the first and second surfaces.

3. The multilayer electronic component of claim 1, wherein
a conductive adhesive portion is disposed between the first and second external electrodes of the capacitor and the first and second metal frames.

4. The multilayer electronic component of claim 1, wherein
the first or second metal frame further includes a prop portion extending to a portion of at least one of the first, second, fifth, and sixth surfaces from the support portion.

5. The multilayer electronic component of claim 1, wherein
the support portion of the first metal frame includes a recess portion disposed to be spaced apart from an end of the support portion of the first metal frame in the first direction and an end of the support portion of the first metal frame in the third direction.

6. The multilayer electronic component of claim 1, wherein
the support portion of the first metal frame includes a plurality of recess portions disposed to be spaced apart from an end of the support portion of the first metal frame in the first direction and an end of the support portion of the first metal frame in the third direction.

7. The multilayer electronic component of claim 1, wherein
the multilayer electronic component includes a plurality of capacitors, and the plurality of capacitors are disposed in the first direction.

8. The multilayer electronic component of claim 1, wherein the first and second internal electrodes are stacked in the first direction.

* * * * *